(12) United States Patent
Suzuki et al.

(10) Patent No.: US 6,195,068 B1
(45) Date of Patent: Feb. 27, 2001

(54) IMAGE DISPLAY SYSTEM

(75) Inventors: Shoji Suzuki; Masahiro Mori; Tsugio Noda; Masayoshi Shimizu; Hirotaka Chiba; Kenichiro Sakai, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/228,975

(22) Filed: Jan. 12, 1999

Related U.S. Application Data

(62) Division of application No. 08/764,276, filed on Dec. 12, 1996.

(30) Foreign Application Priority Data

Jun. 28, 1996 (JP) .................................................. 8-168889

(51) Int. Cl.[7] ...................................................... G09G 5/00
(52) U.S. Cl. .................................... 345/1; 345/7; 345/127
(58) Field of Search ................................ 348/750, 751, 348/756, 121, 123, 116, 117, 38, 39; 345/1, 7, 8, 9, 3, 87, 94, 98, 103, 100, 208, 127; 349/6, 7, 8

(56) References Cited

U.S. PATENT DOCUMENTS 5,612,709 * 3/1997 Sudo et al. ............................... 345/7
5,732,202 * 3/1998 Okamoto ............................... 385/117

FOREIGN PATENT DOCUMENTS

| 2284131 | 5/1995 | (GB) . | |
| 3-53287 | * 3/1991 | (JP) | 345/1 |
| 4-269793 | * 9/1992 | (JP) | 345/1 |
| 5-173490 | * 7/1993 | (JP) | 345/1 |

* cited by examiner

Primary Examiner—Dennis-Doon Chow
(74) Attorney, Agent, or Firm—Staas & Halsey, LLP

(57) ABSTRACT

Image data from an upper apparatus is compressed by a compressing unit, the compressed image data is transferred to a display apparatus by a printer interface of a low speed, and the original image data is reconstructed by a decoding unit and displayed. The display apparatus is a projector and auxiliarily displays a second picture plane into a first picture plane for presentation by an independent liquid crystal panel. A phase transition type liquid crystal panel of a number of pixels and a high resolution is used to display the first picture plane and the image data is compressed and transferred and is displayed. As a second picture plane, a personal computer picture plane is transferred and displayed as it is.

17 Claims, 28 Drawing Sheets

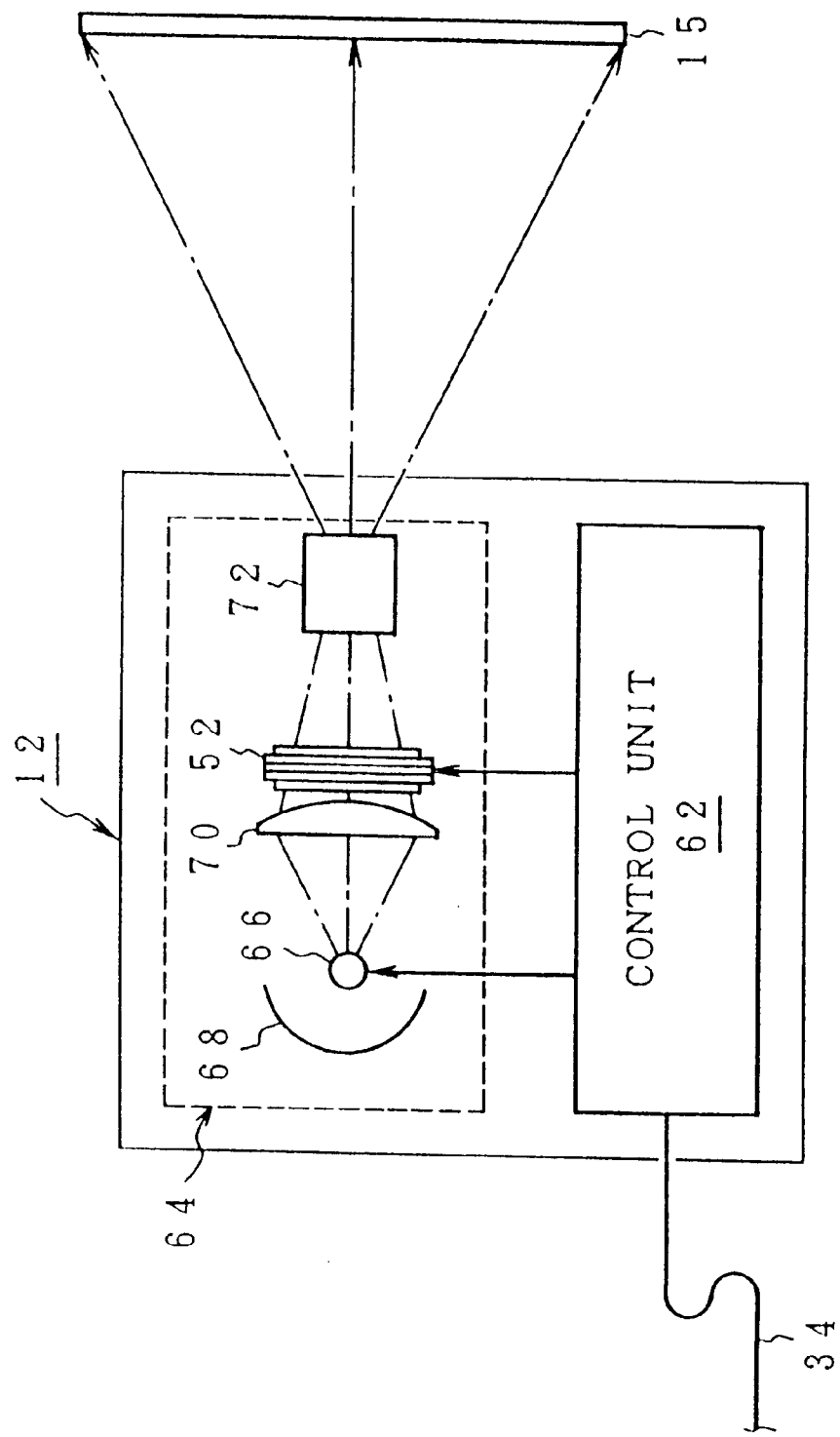

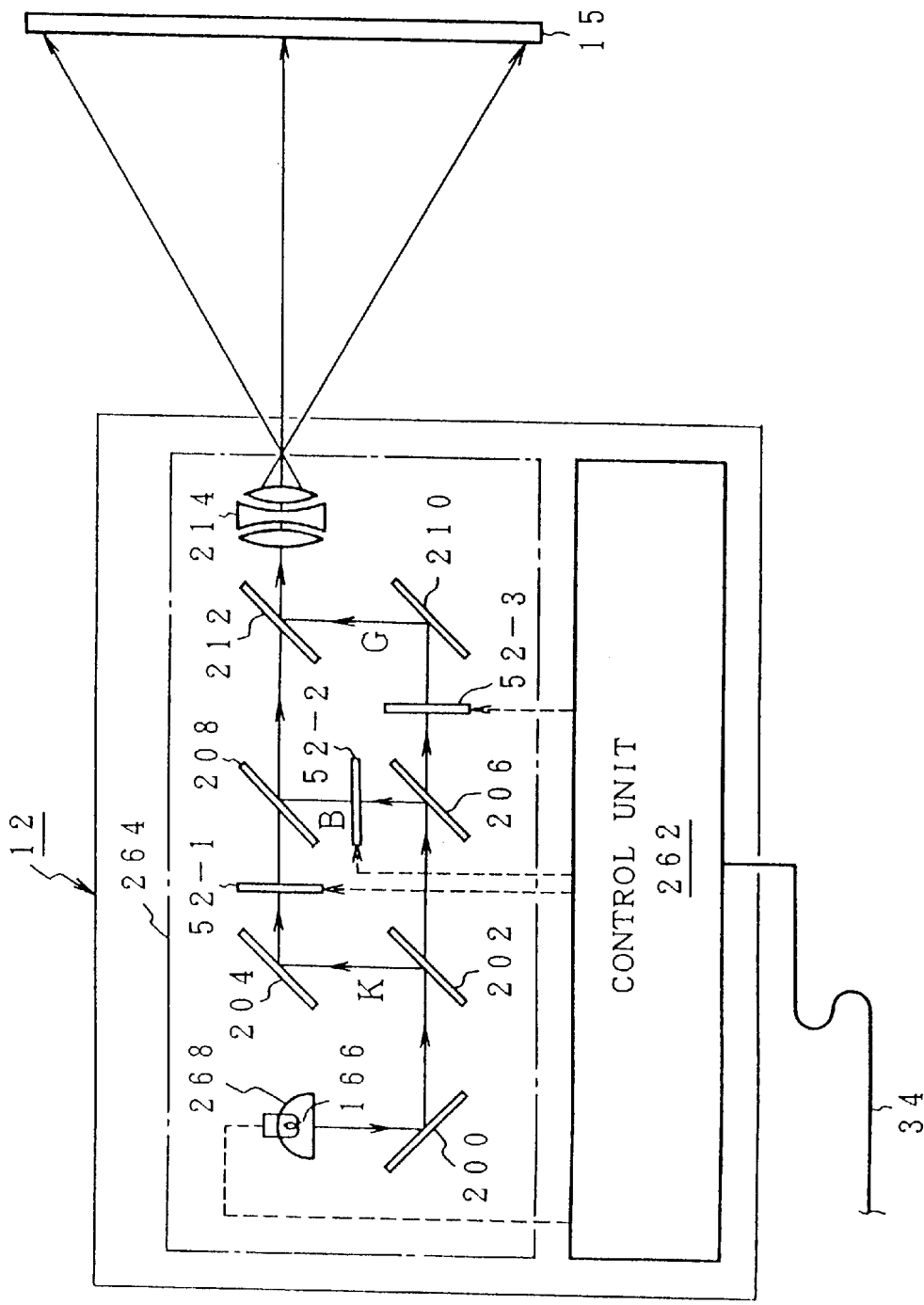

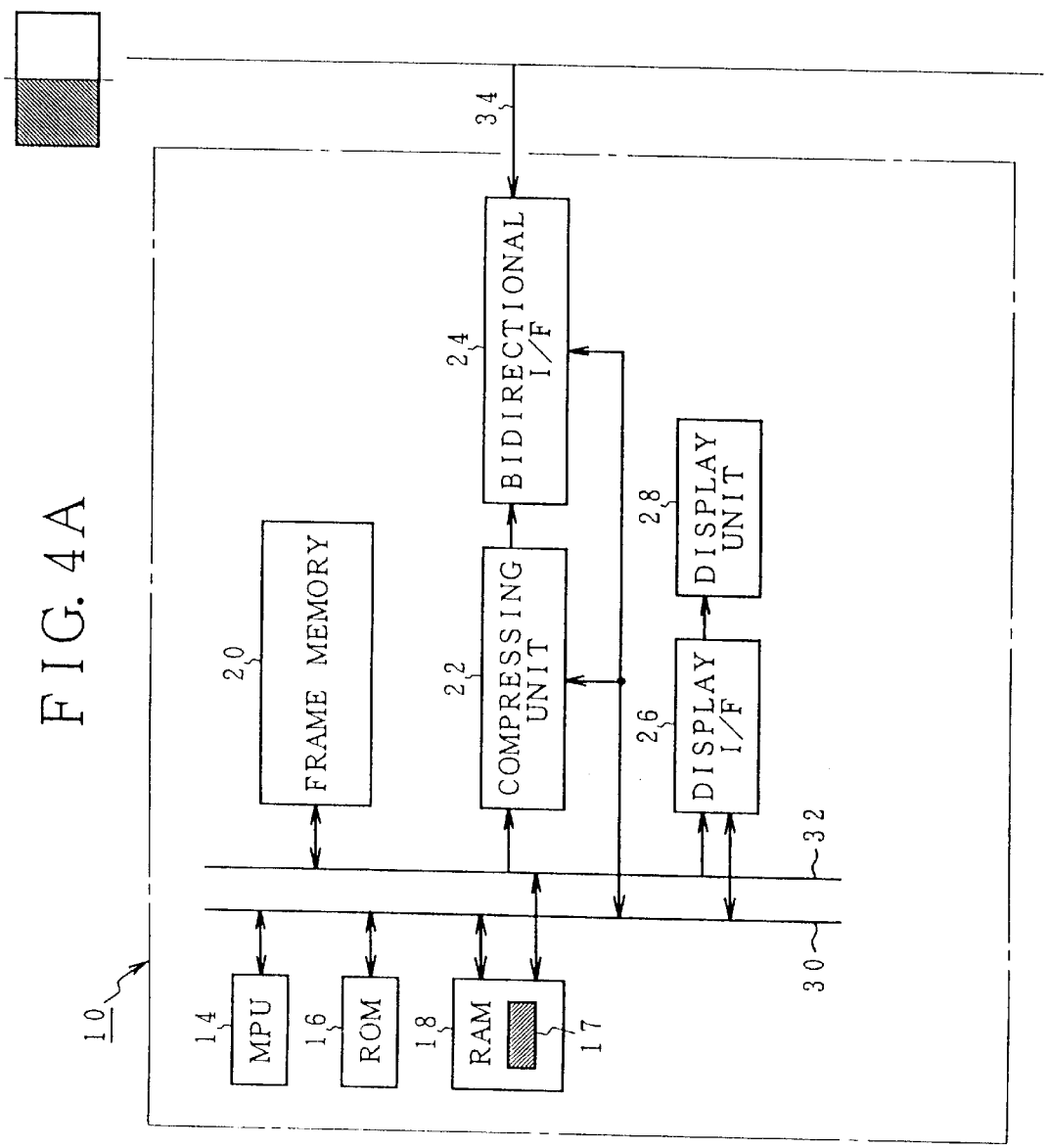

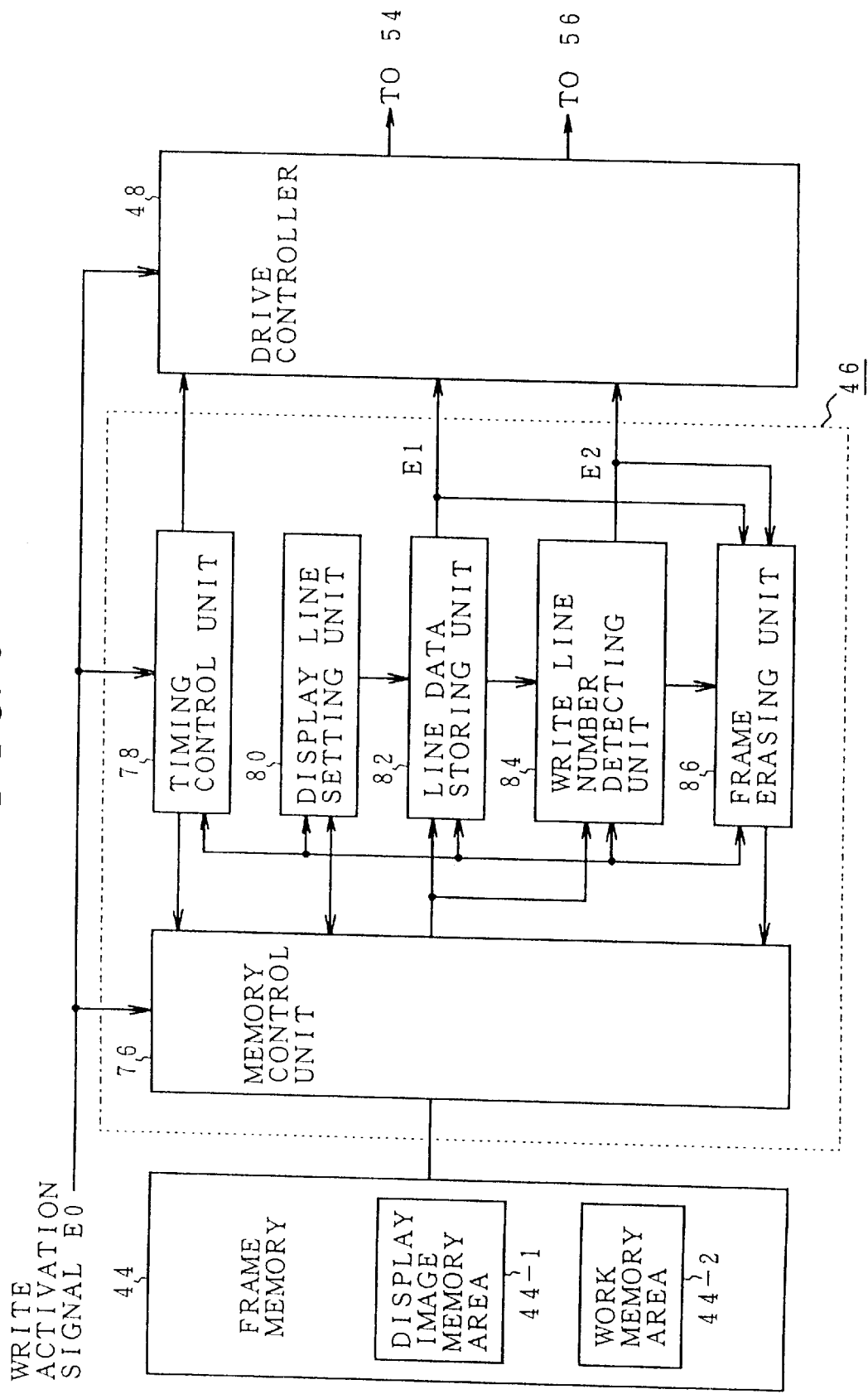

● DRAWING IS FINISHED
■ NEW DRAWING

◎ ERASURE PIXELS

● DRAWING IS FINISHED
■ NEW DRAWING

◎ ERASURE PIXELS

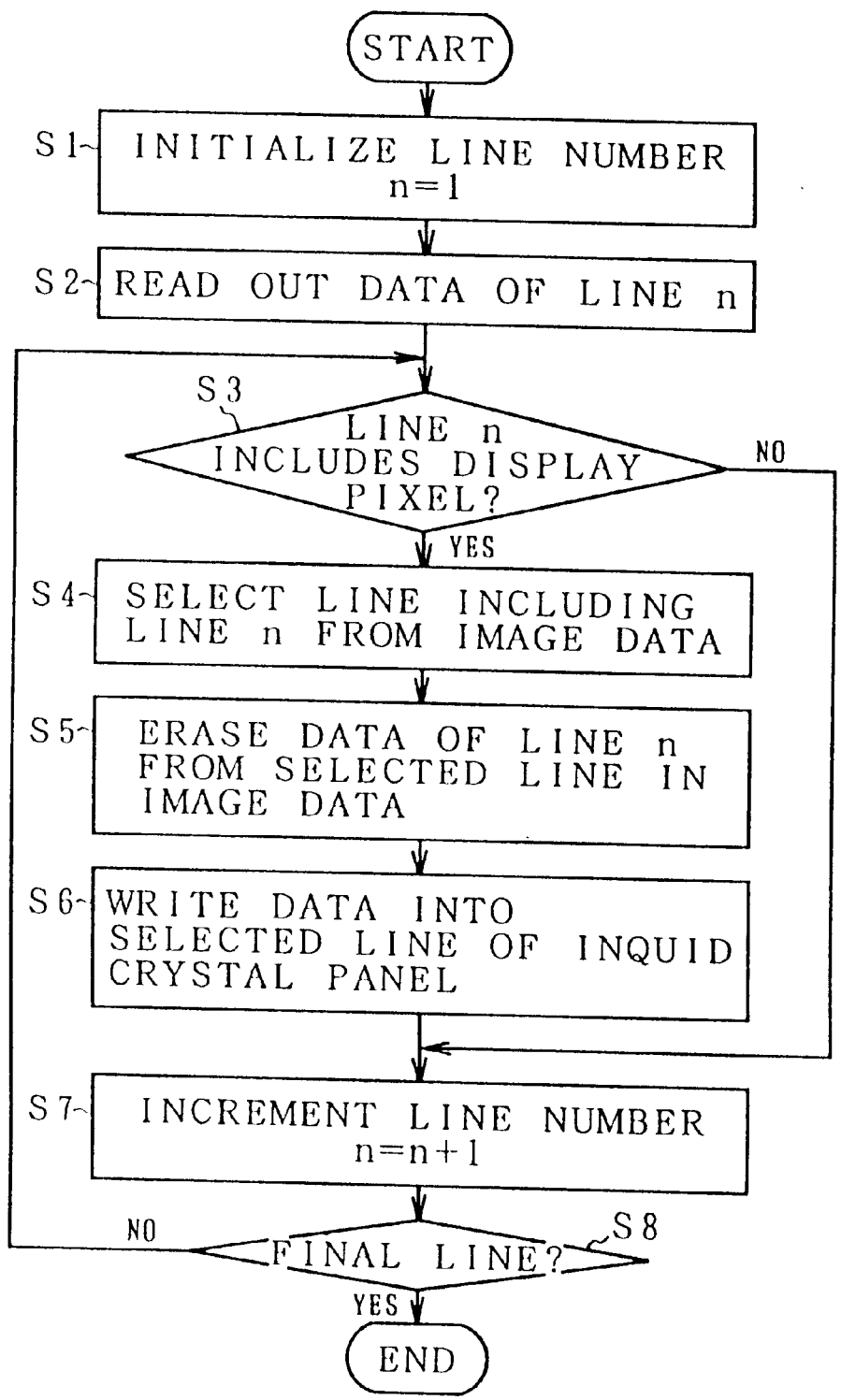

- ● DRAWING IS FINISHED
- ■ NEW DRAWING
- ◆ OVERWRITING

◎ ERASURE PIXELS

- ● DRAWING IS FINISHED
- ■ NEW DRAWING

◎ ERASURE PIXELS

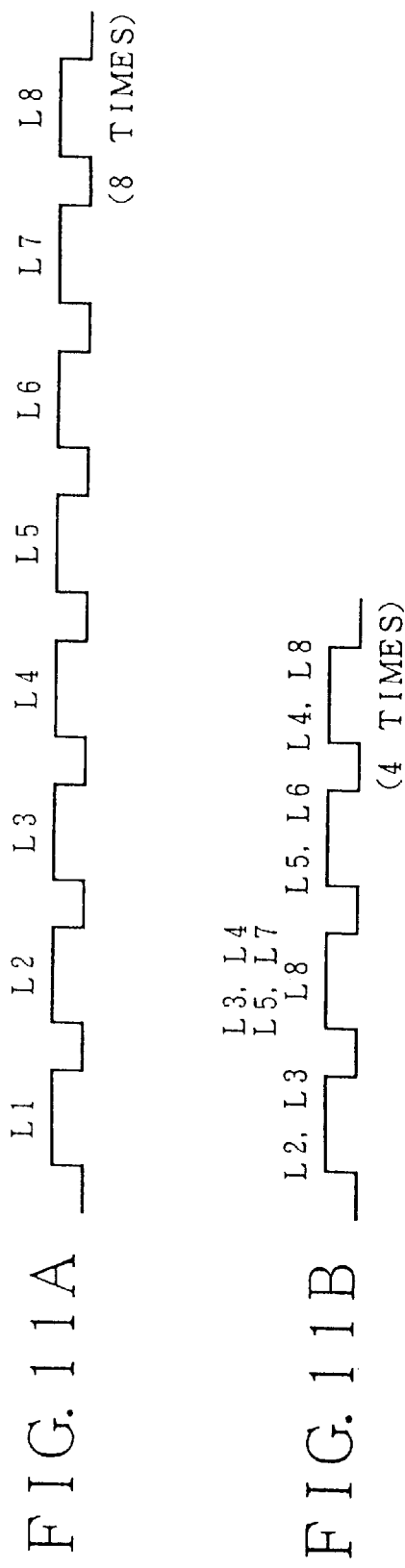

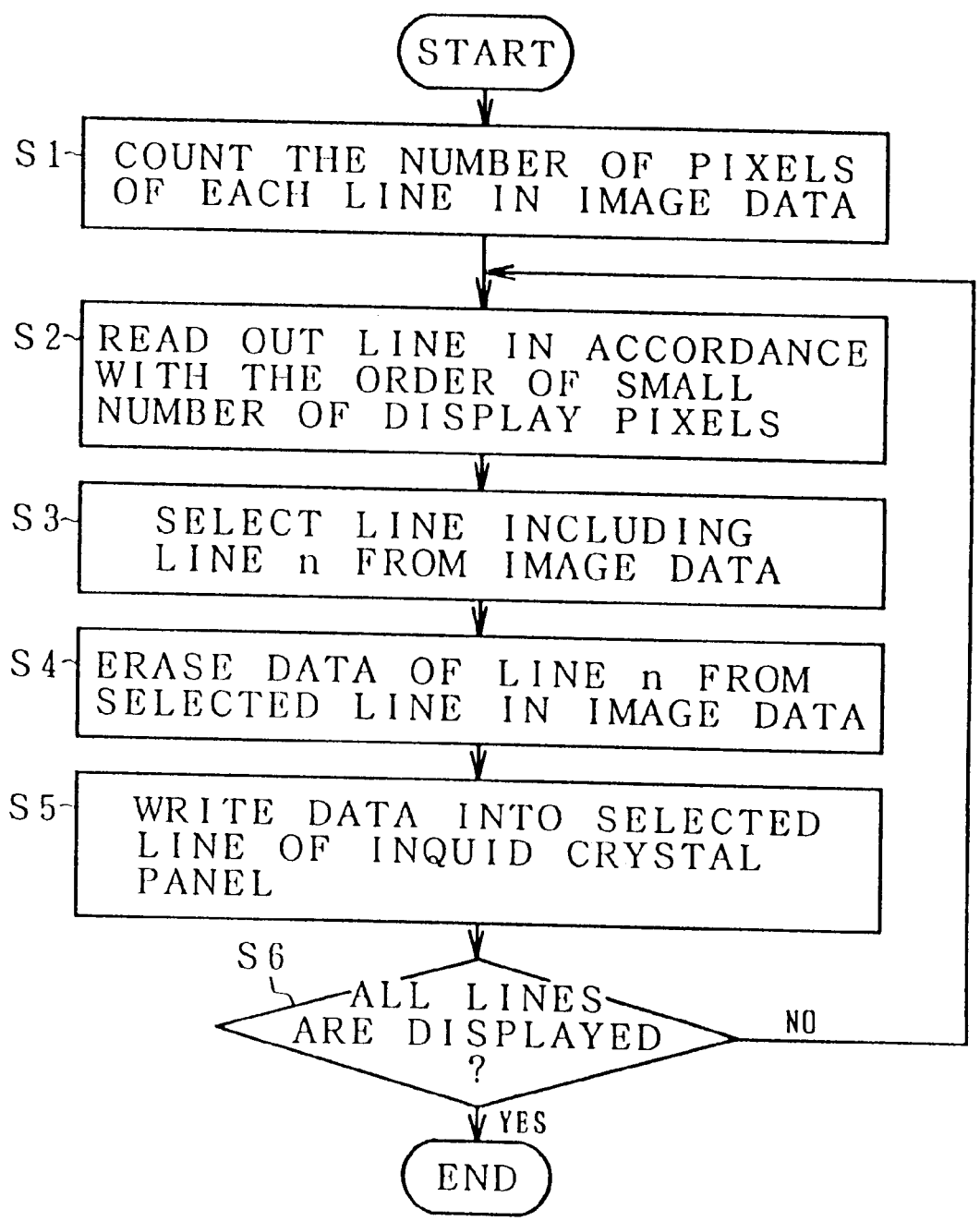

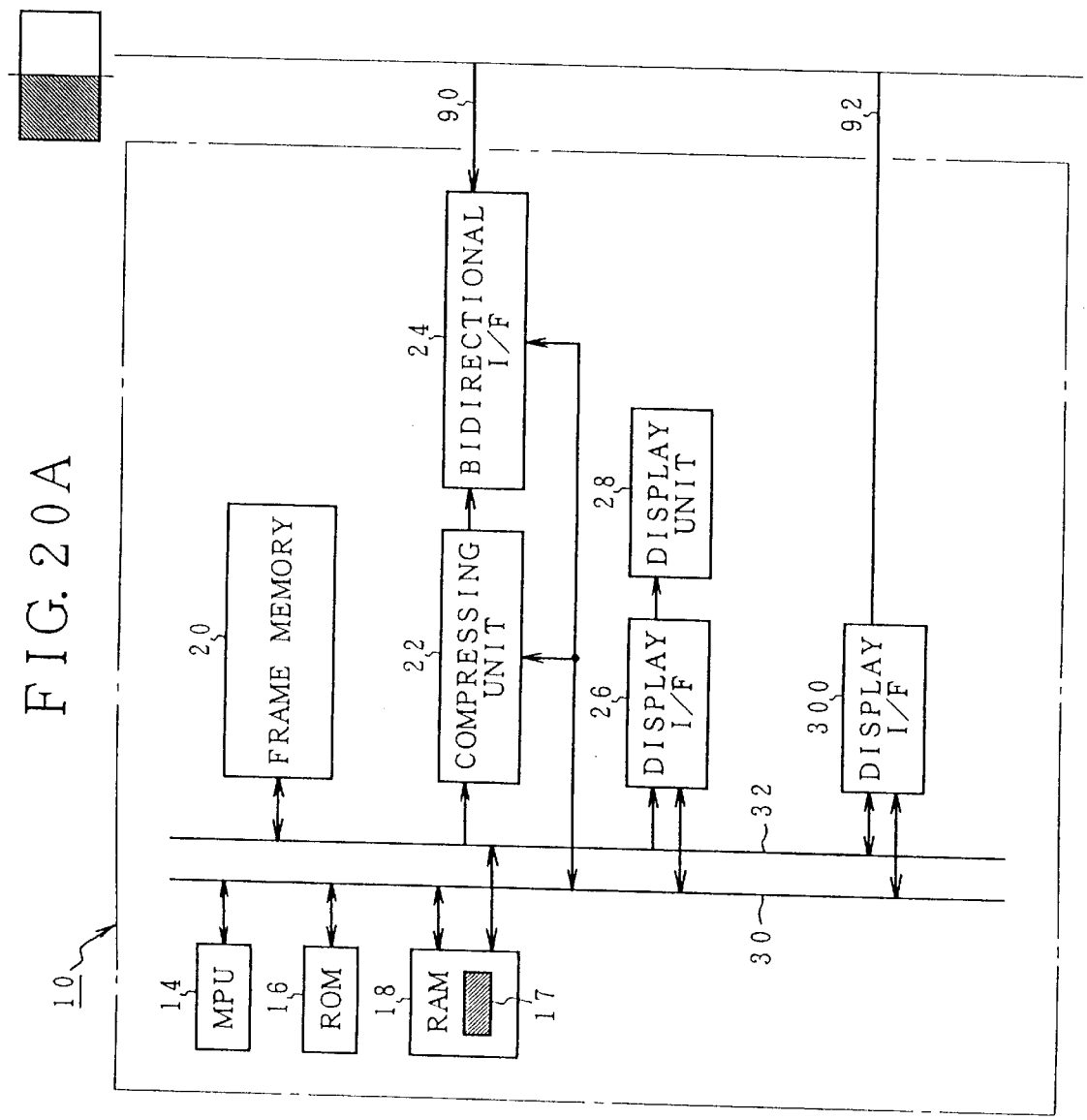

IMAGE DISPLAY SYSTEM

This application is a Divisional of application Ser. No. 08/764,276, filed Dec. 12, 1996.

BACKGROUND OF THE INVENTION

The invention relates to an image display system for transferring image data converted into bit map data from an upper apparatus such as a personal computer or the like to a display apparatus such as a liquid crystal projector or the like and for displaying an image. More particularly, the invention relates to an image display system for displaying an image at a high speed by using an existing bidirectional interface such as a printer interface having a low data transfer speed.

Hitherto, as a display apparatus of a personal computer, a CRT display, a liquid crystal display, or the like is often used. Those display apparatuses are connected to an interface for display of the personal computer and transfer a signal such as an analog RGB signal or the like and display characters or an image. In recent years, many image display systems such that a projector apparatus is externally connected to a personal computer and a presentation is efficiently performed have been put into practical use. In the presentation, a picture plane by bit map data (dot data) such as document, image, or the like developed in a frame memory of a personal computer is transferred to a projector, thereby allowing the same picture plane contents to be projected and displayed on a screen. The projector is generally constructed by: a light source such as a halogen lamp or the like; an optical system such as liquid crystal panel, mirror, lens, etc.; and the like. In a display driving, an image to be displayed on the liquid crystal panel is drawn, the image is projected to the screen by the light which is irradiated and transmitted from the back side by a light source lamp, and the projected image is magnified and displayed. As a liquid crystal panel, a TFT (Thin Film Transistor) liquid crystal panel of the active drive type or the like is used.

However, at present, the number of pixels which can be displayed by the TFT liquid crystal panel used in the projector is equal to a value within a range about from (640×480) pixels to (1280×1024) pixels. Therefore, when a document or a table of the picture plane of the personal computer is magnified and projected by the projector, since the number of pixels is small, it is difficult to read the document, table, or the like. In the presentation using the projector, consequently, the image such as a document or the like of the personal computer cannot be used as it is and there is a complexity such that a document image or the like in which a character size is magnified has to be newly formed so as to enable the image to be clearly seen when it is magnified and displayed by the projector. According to the existing projector, since the same picture plane as the display picture plane of the personal computer is projected and displayed, auxiliary information necessary for retrieval, switching, and the like of the picture plane cannot be obtained. There is, consequently, a problem such that it is difficult to select and explain the picture plane during the presentation or at the time of questions and answers. Further, since only one picture plane can be displayed by the existing projector, even if the operator wants to insert a plurality of picture planes such as document, graph, and the like into one picture plane and to simultaneously display them onto the screen, there are problems such that since the number of pixels per picture plane is small, a picture quality further deteriorates and, in order to maintain a picture quality, there is only a way of switching the picture plane and an efficiency of the presentation is bad.

To solve such a problem of the small number of pixels of the liquid crystal panel of the projector, it is considered to use, for example, a phase transition type liquid crystal panel which realizes a number of pixels and a high resolution. As compared with a liquid crystal display panel of the active matrix driving type such as a TFT liquid crystal or the like, since the phase transition type liquid crystal panel is of the simple matrix driving type and has a simple structure, it is suitable for realizing a number of pixels and a high precision. At present, the phase transition type liquid crystal panel of the A4 size having (2500×3500) pixels or more has been put into practical use. The phase transition type liquid crystal panel has a structure such that transparent line electrodes and data electrodes are arranged in a matrix form and a liquid crystal material is sandwiched between the electrodes at an intersecting position of both of them. To drive the matrix-form electrodes by voltages, two driver circuits of a line electrode driver and a data electrode driver are provided. In a display operation of the phase transition type liquid crystal panel, the line electrode to be displayed is selected and a voltage is applied by the line electrode driver. On the other hand, the data electrode driver applies voltages according to the pixels to be displayed and the pixels not to be displayed in the pixel data to be written. The liquid crystal of each pixel on the selected line electrode becomes a cholesteric phase in which an incident light is scattered when no voltage is applied, so that "black" in which a light transmittance is low is displayed. On the contrary, when a voltage is applied, the liquid crystal becomes a nematic phase in which a light transmittance is high, so that transparent "white" is displayed. As mentioned above, by displaying in accordance with a difference between the light transmittances and sequentially repeating similar processes with respect to all lines, the display of the whole picture plane is accomplished. The phase transition type liquid crystal panel has a memory function. By applying a holding voltage, the display data which has once been written is displayed as it is. The details of the phase transition type liquid crystal panel have been disclosed in, for example, Phase transition type projection display (Display and Imaging, Vol. 1, No. 1, pp. 61–69, 1992)

A5-M pixel overhead projection display utilizing a nematic-cholesteric phase-transition liquid crystal (Journal of the Society for Information Display, Vol. 1, No. 1, pp. 43–49, 1993)

According to the phase transition type liquid crystal panel as mentioned above, although the resolution is high and the light transmittance is high and the screen is bright, there are problems such that the display speed is slow and the rewriting time of the picture plane is slower than that of the TFT liquid crystal panel. Namely, it takes tens of milliseconds to rewrite from black (scattering state) to white (transparent state) and, contrarily, a writing time of a few milliseconds is required to rewrite from white (transparent state) to black (scattering state). For example, it takes about 20 seconds to display an image after the phase transition type liquid crystal panel of (2500 lines×3500 pixels) was initialized. To solve the above problem such that the rewriting time of the picture plane of the phase transition type liquid crystal panel is slow, in the conventional display control, data of a previous picture plane and data of a new picture plane are always compared and only a different portion is rewritten, thereby reducing the rewriting time (refer to JP-A-61-138991, JP-A-2-217893, JP-A-7-5845, etc.). In the conventional display control in which only the different portion between the new and previous picture planes is rewritten, there is an effect when a picture plane having continuous contents like a motion image is switched. In a liquid crystal projector for mainly displaying a still image for the purpose of presentation or the like, however, there are many cases where the contents of the picture plane are exactly different every time. Even if only the portion different from the previous picture plane is rewritten, a reduction of the rewriting time cannot be expected. It is necessary to improve such a point.

Further, in case of connecting the projector to a personal computer as an external display apparatus and transferring and displaying picture plane data, which interface is used becomes a problem. An interface for display of the personal computer transfers a signal such as an analog RGB signal or the like and displays characters or an image. However, although the interface for display is an analog interface and has a high speed, it can perform only the unidirectional transfer and cannot transfer a signal from the display apparatus to the personal computer. The display interface, therefore, cannot be used for the projector which needs a bidirectional transfer. As another interface for the personal computer, a parallel interface such as IEEE 1284 or the like to connect a printer apparatus is known. The parallel interface is a digital bidirectional interface and transfers bit map data, so that it is suitable to transfer image data to the projector. In case of transmitting data to a printer by, for example, a centronics interface or the like known as a bidirectional interface for printer, a transfer speed is equal to about 100 kbytes/sec. Since A4 monochromatic data having a resolution of 300 dpi corresponding to a display with a number of pixels of the phase transition type liquid crystal panel has a capacity of about 1 Mbytes, it takes a time of about ten seconds to transfer image data. A printing speed of a printer for personal computer corresponds to a value within a range from 30 seconds to about one minute per sheet of paper of the A4 size in case of, for example, an ink jet printer. No problem occurs about the data transfer speed. In the display apparatus of the projector or the like, even in case of the phase transition type liquid crystal panel of a slow display speed, one picture plane can be displayed in a few seconds. In the bidirectional interface for printer, there is a problem such that the display speed is limited by the transfer speed. Therefore, the projector cannot be connected to the personal computer by using the printer interface equipped as a standard device, an exclusive-use interface of a high transfer speed has to be additionally provided, and the bidirectional interface for printer lacks generality. Further, even if the display speed of the phase transition type liquid crystal panel is improved, the data transfer speed in the printer interface cannot follow the display speed and a problem such that the display speed is limited by the data transfer speed occurs.

SUMMARY OF THE INVENTION

According to the invention, there is provided an image display system which can transfer image data by using the existing interface for printer without limiting a display speed of a projector or the like. According to the invention, there is provided an image display system in which a projector is used as a display apparatus and two picture planes of a main picture plane and an auxiliary picture plane are transferred from a personal computer and can be displayed at a high quality on a screen by using individual display panels. Further, according to the invention, an image display system which can realize a high display speed in case of using a phase transition type liquid crystal panel for projector is provided.

The invention relates to an image display system for transferring image data from, for instance, a personal computer as an upper apparatus to a display apparatus and displaying. The upper apparatus comprises: an image data storing unit in which image data developed to bit map data has been stored; a compressing unit for reading out and compressing the image data in the image data storing unit; and a first interface having a bidirectional transmitting function to transfer the image data compressed by the compressing unit to the display apparatus. The display apparatus comprises: a second interface having a bidirectional transmitting function for receiving the compressed image data transferred from the upper apparatus; a decoding unit for decoding the original image data by decoding the compressed image data received by the second interface unit; and a display unit for visually displaying the image data decoded by the decoding unit. As first and second interfaces, parallel interfaces for printer each having the bidirectional transmitting function are used. As compared with the data transfer speed of each of the first and second interfaces, the display speed of the display unit is high. In the image data display system of the invention as mentioned above, even when the data transfer speed of the interface for connecting the upper apparatus and the display apparatus is lower than the display speed, since the image data is compressed and transferred, the data transfer speed can be increased in accordance with a compression ratio. The image data can be efficiently transferred by using the low speed printer interface without limiting the data display speed.

As another embodiment of the invention, in addition to the image data storing unit in which first image data to be transferred to the display apparatus and second image data to be displayed to the self display have been stored, the compressing unit for reading out and compressing the first image data in the image data storing unit, and the upper side bidirectional interface for transferring the first image data compressed by the compressing unit to the display apparatus, a transmission interface to transmit the second image data in the image data storing unit which can be displayed to a display of the upper apparatus itself to the display apparatus is provided for the upper apparatus. In correspondence to the transmission interface, the display apparatus is equipped with: a display side bidirectional interface for receiving the compressed image data transferred from the upper apparatus; a decoding unit for reconstructing the original first image data by decoding the compressed image data transferred from the upper apparatus; and a drawing controller for displaying the first image data decoded by the decoding unit to a display unit. Further, a reception interface for receiving the second image data transmitted from the upper apparatus and a display controller for allowing the second image data received by the reception interface to be displayed to the display unit are provided. In this case as well, each of the upper side and display side bidirectional interfaces is a parallel interface having the bidirectional transmitting function for printer. On the other hand, each of the transmission interface and the reception interface is an interface for display having a unidirectional transmitting function. Further, as compared with the data transfer speed between the upper side interface and the display side interface, the display speed of the display unit is high.

The display unit of the display apparatus of the invention is, for example, a projector unit for optically projecting a display image of a display panel onto a screen and displaying. The projector unit has: a first display panel for projecting and displaying a first image drawn by a drawing controller onto the screen; a second display panel for projecting and displaying a second image drawn by the display controller onto the screen; and an adjusting unit for adjusting display positions and display sizes of the first and second images on the screen. Thus, two picture planes can be projected and displayed on the screen of the projector by the drawing of each of the independent display panels. In this case, the first picture plane on the screen is a main enlarged display picture plane which is used for presentation. Auxiliary information such as guidance, picture plane information, and the like which are necessary for explanation of the presentation can be clearly displayed by the second picture plane of a small size in such an enlarged display picture plane. The adjusting unit of the projector is a projection optical unit which can independently adjust projecting positions and magnifications of the first and second display panels. Specifically speaking, the adjusting unit enlargedly displays the first image of the first display panel to the whole screen and also overlappingly displays the second image of the second display panel at a small size onto a part of the screen. A display size of the second image in this case is set to a size that is almost equal to that of the display screen provided for the upper apparatus. To properly perform an overlap display of two picture planes, the drawing controller converts the image portion corresponding to the display area of the second image to be overlappingly displayed onto the first image which was projected and displayed onto the screen into black data, draws the first image onto the first display panel, and projects and displays the second image into a blank portion of the image on the screen due to the drawing of the black data of the first image. On the basis of a distance from the projector unit to the screen, a direction, and a magnification, the first drawing controller converts the area of the image data corresponding to a display size of the second image which has been predetermined into the black data.

The projector unit uses a phase transition type liquid crystal panel as each of the first and second display panels. The drawing controller comprises: a display line setting unit for setting an order of display lines which are written and displayed to the liquid crystal display panel; a reading unit for reading out line data from the image data storing unit in accordance with the order set by the display line setting unit; a write line detecting unit for comparing the line data with each line data in the image data storing unit and detecting write display lines for the liquid crystal display panel each time the line data is read out by the reading unit; and a display driving unit for writing and displaying the line data read out by the reading unit to one or a plurality of display lines of the liquid crystal display panel detected by the display line detecting unit. By the writing display of the phase transition type liquid crystal panel as mentioned above, the writing display of a plurality of lines is simultaneously executed by the writing of one time. The writing display of all pixels can be completed before the writing of all lines is executed. Particularly, with respect to image data such that display pixels are arranged in the direction which perpendicularly crosses the display lines, the simultaneous writing by the line data which is common to each line is efficiently executed. The writing display is completed in an extremely short time. For example, in a rectangular image of a square or rectangular shape, the writing display of all pixels is completed by only the writing process of the head line in which the display pixels appear. The display by the simultaneous writing of a plurality of lines is executed in accordance with the order from the large number of display pixels existing commonly for a plurality of lines. The present system essentially has a hierarchical display function such that at the writing initial stage, the image schematically appears and is switched to the detailed display with the elapse of time. Therefore, in the retrieval or the like of the picture plane, the outline of the image can be recognized at the writing initial stage. The retrieval by the switching of the picture plane can be executed at a fairly high speed. For example, in document image data including ruled lines (vertical ruled lines) which perpendicularly cross the display lines like a graph or table, the vertical ruled lines are displayed all together at the writing initial stage, so that a state in which the image includes the table or graph can be immediately recognized. The reading unit has a display pixel detecting unit for detecting whether the read-out line data includes the display pixels which need to be written to the liquid crystal panel or not. When the line data doesn't include any display pixel, the write line detecting unit and the display unit are skipped and the next display line is read out. Thus, the line data including no display pixel is excluded from writing processing targets. The display speed is improved by an amount of the excluded line data. The write line detecting unit detects the same display lines as those of the line data read out by the reading unit from the image data storing unit. Such a detection corresponds to a process to obtain the ANDs of the display pixels of the display line which is at present a processing target and the other lines. By simultaneously writing the same line data to a plurality of lines, the display speed is improved. The write line detecting unit detects display lines partially including the line data read out by the reading unit from the image data storing unit. The other lines including the display pixels of the display line which is at present a processing target are detected and the line data of the processing target line is simultaneously written to a plurality of detected lines, so that the number of pixels to be written at one time is increased as large as possible, thereby improving the display speed. The display driving unit executes an addition writing to write to only the pixels which are not written to the liquid crystal panel. The display unit can also overwrite to the pixels which have already been written. When all of the display pixels of the detected display lines have already been written, the write line detecting unit excludes the detected lines from the write lines. Specifically speaking, it is sufficient to erase the written display pixels in the image data storing unit each time the writing is executed and to repeat the displaying process with respect to the display pixels which are not written yet. The processing line setting unit sequentially designates the display lines of the display unit from the head, thereby allowing the reading unit to read out the line data. It is also possible to sequentially designate the display lines in accordance with the order from the small number of display pixels included in the line data and to read out the line data. As the number of display pixels of the line data is small, the number of other line data including them is large. Therefore, the number of display lines to be written at one time increases and a more efficient writing display can be expected.

Further, the invention provides the projector itself. The projector has: a first display panel for projecting and displaying a first image which is drawn by the drawing controller onto the screen; a second display panel for projecting and displaying a second image which is drawn by the display controller onto the screen; and an adjusting unit for adjusting display positions and display sizes of the first and second images on the screen. In this case as well, the drawing controller converts the image portion corresponding to the display area of the second image to be overlappingly displayed to the first image which was projected and displayed on the screen into the black data and draws the first image onto the first display panel, thereby allowing the second image to be projected and displayed to the blank portion of the image on the screen by the drawing of the black data of the first image.

The above and other objects, features, and advantages of the present invention will become more apparent from the following detailed description with reference to the drawings.

BRIEF DESCRIPTION OF THE DRAWINGS

FIG. 2 is an explanatory diagram of a projector apparatus of FIG. 1 for displaying a monochromatic image;

FIG. 3 is an explanatory diagram of the projector apparatus of FIG. 1 for displaying a color image;

FIGS. 4A and 4B are block diagrams of an embodiment of a circuit of a personal computer and the projector apparatus in FIG. 1;

FIG. 6 is a functional block diagram of a drawing controller in FIGS. 4A and 4B;

FIG. 9 is a flowchart for a writing display process in FIG. 3;

FIGS. 11A and 11B are timing charts showing the number of times of the writing display operation in FIGS. 10A to 10E in comparison with the conventional one;

FIG. 12 is a flowchart for a writing display process in FIGS. 10A to 10E;

FIGS. 20A and 20B are block diagrams of an embodiment of a circuit of a personal computer and the projector apparatus in FIG. 13;

DETAILED DESCRIPTION OF THE PREFERRED EMBODIMENT

[Transfer display with a number of pixels by printer interface]

Figure 1:
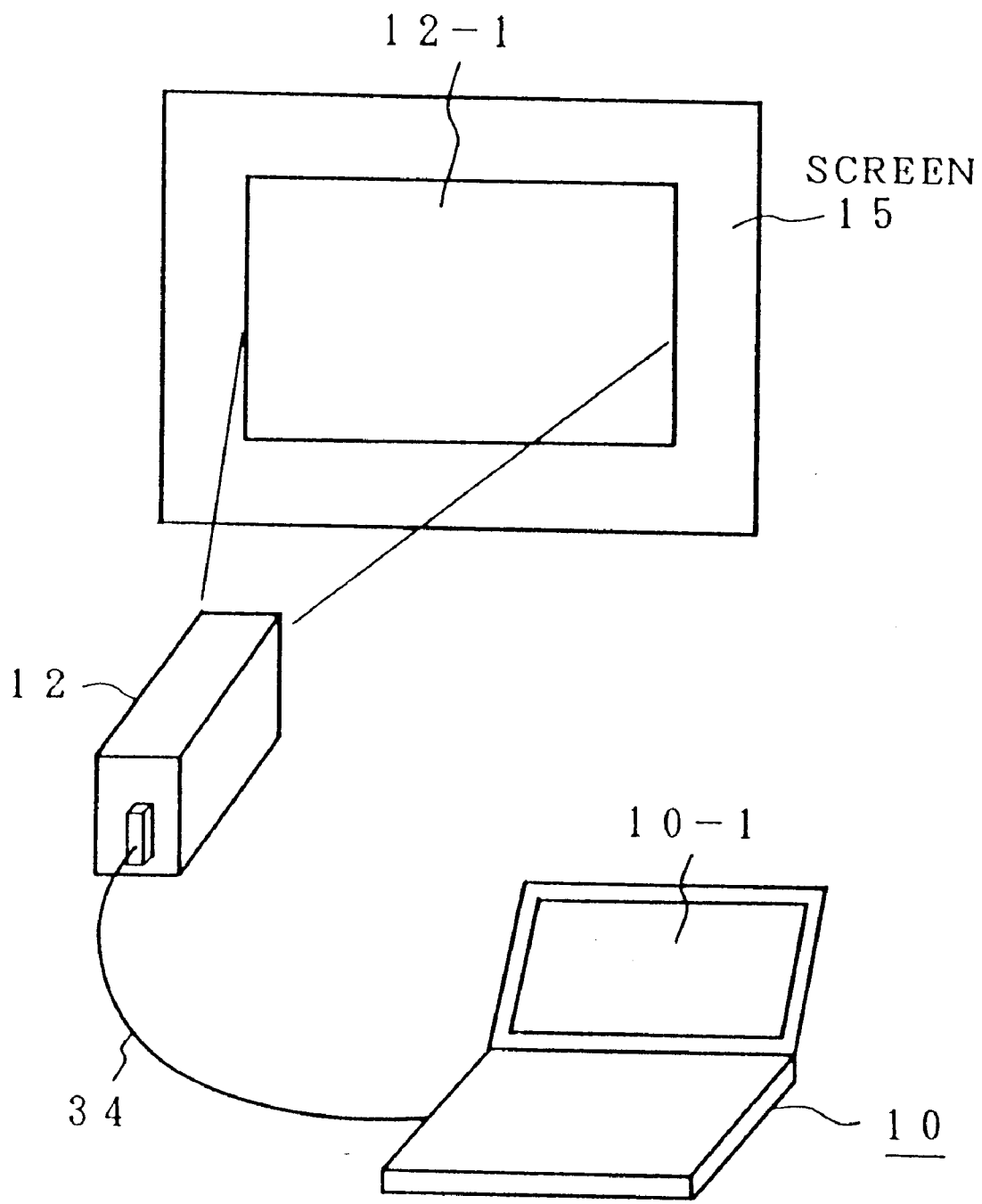
FIG. 1 is an explanatory diagram of an embodiment of the invention.

FIG. 1 shows an embodiment of an image display system of the invention. The image display system of the invention is constructed by a personal computer 10 as an upper apparatus and a projector apparatus 12 connected as an external display apparatus of the personal computer 10. The personal computer 10 has a liquid crystal display (LCD) 10-1. The LCD 10-1 uses a TFT liquid crystal panel and has pixels of the number within a range, for example, about from (640×480) pixels to (1280×1024) pixels. The projector apparatus 12 is connected to the personal computer 10 via an interface-cable 34. As an interface for connecting the personal computer 10 and projector apparatus 12, a bidirectional parallel interface which is used in a printer for personal computer is used. For example, a Centronics interface according to IEEE 1284 or the like is used. The projector apparatus 12 has therein a liquid crystal panel, draws an image transferred from the personal computer 10 to the liquid crystal panel, and displays a projector image 12-1 onto a screen 15 which is separately arranged by a light projection from a light source. The liquid crystal panel used in the projector apparatus 12 of the invention is a phase transition type liquid crystal panel and has the pixels of the number of, for instance, four million pixels (2000×2000 pixels). As a projector image 12-1 on the screen 15, a high picture quality equivalent to that of a print by a printer having a resolution of 300 dpi can be realized at the A4 size.

FIG. 2 shows an embodiment of the projector apparatus 12 of FIG. 1. As a projector apparatus 12, a display of a monochromatic image is shown as an example. The projector apparatus has a control unit 62 and an optical unit 64. The optical unit 64 has a light source 66 using a halogen lamp or the like and irradiates the light from the light source 66 at a front position by a deflector 68. The light from the light source 66 is converged by a condenser lens 70 and transmits a liquid crystal panel 52. After that, the light is enlarged and displayed on the screen 15 by a projection lens 72. As a projection lens 72, an autofocusing mechanism and a zoom mechanism can be provided as necessary.

FIG. 3 shows another embodiment of the projector apparatus 12 in FIG. 1 and is characterized by a color projector. A control unit 262 and a color optical unit 264 are provided for the projector apparatus 12. In the color optical unit 264, a white light from a light source 266 having a deflector 268 is reflected by a reflecting mirror 200 and is inputted to a dichroic mirror 202. The dichroic mirror 202 has a wavelength selectivity, reflects a red component R, and transmits other wavelength components. The red component R reflected by the dichroic mirror 202 is inputted to a liquid crystal panel 52-1 from a reflecting mirror 204. The liquid crystal panel 52-1 is drawn and driven by the control unit 262 on the basis of the image of the red component R, so that it generates an image light of the red component R corresponding to the drawing image. The light other than the red component R transmitted through the dichroic mirror 202 enters a dichroic mirror 206. A blue component B is reflected and the other wavelength components are transmitted. The blue component B reflected by the dichroic mirror 206 is transmitted through a liquid crystal panel 52-2. The liquid crystal panel 52-2 is drawn by the control unit 262 on the basis of the image of the blue component B and generates an image component corresponding to the image of the blue component B. The light transmitted through the dichroic mirror 206 is a remaining green component G. The green component G is transmitted through a liquid crystal panel 52-3. The liquid crystal panel 52-3 is drawn by the control unit 262 on the basis of image data of the green component R and generates an image light corresponding to an image drawing of the green component G. The image light of the red component R from the liquid crystal panel 52-1 and the image light of the blue component B from the liquid crystal panel 52-2 are synthesized by a dichroic mirror 208. Subsequently, the image light of the green component G reflected from a reflecting mirror 210 from the liquid crystal panel 52-3 is synthesized by a dichroic mirror 212, so that a synthesis image light of three components of R, G, and B is derived. Finally, the RGB synthesis image light enters a projection lens 214 and a color image is projected and displayed onto the screen 15.

Figure 4B:
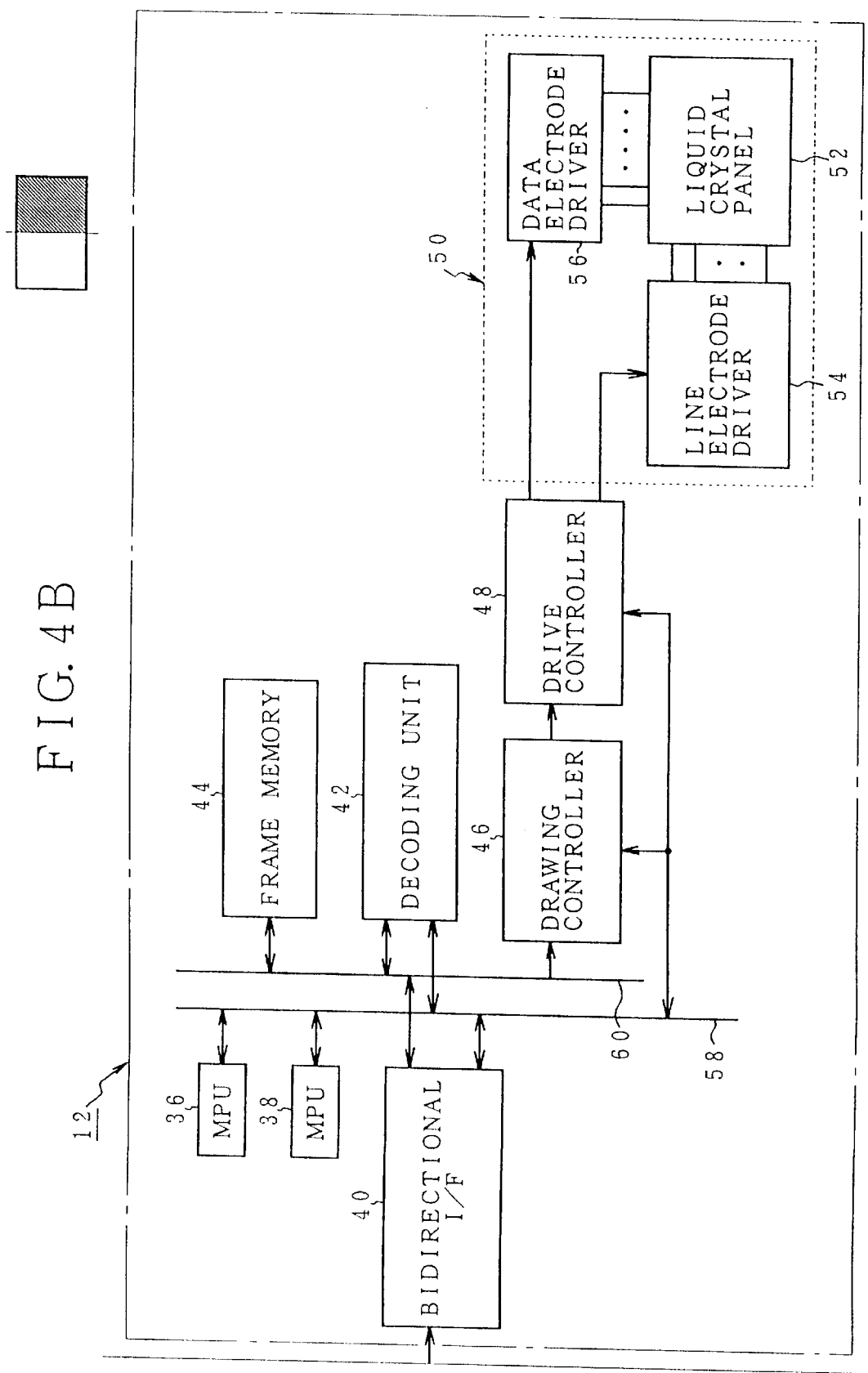

FIGS. 4A and 4B show an embodiment of a circuit construction of the image display system of FIG. 1. An MPU 14 is provided for the personal computer 10 as an upper apparatus. The MPU 14 has a system bus 30 and a data bus 32. An ROM 16 functioning as a program memory and an RAM 18 functioning as a data memory or work memory are connected to the MPU 14 through the system bus 30. The RAM 18 is also connected to the data bus 32. Image data to be outputted and displayed is developed in bit map data (dot data) and stored into a frame memory 20. A compressing unit 22 and a bidirectional interface 24 on the upper side are provided as a transfer circuit unit for the projector apparatus 12 which is externally connected. The compressing unit 22 compresses image data to be transferred to the projector apparatus 12 and outputs the compressed data to the bidirectional interface 24. As a compressing algorithm by the compressing unit 22, for example, an MMR encoding algorithm which is known as a compressing method of bit map data (dot data) and is the same as an algorithm used for a facsimile apparatus or the like is used. A compressing process by the compressing unit 22 can be realized as software by the MPU 14 or as exclusive-use firmware or hardware. Further, a display unit 28 is connected to the personal computer 10 through a display interface 26. The display unit 28 has the liquid crystal display 10-1 in FIG. 1. A TFT type liquid crystal panel is used as a liquid crystal display (LCD) 10-1. The LCD 10-1 has pixels of the number within a range from about (640×480) pixels to (1280×1024) pixels. The display interface 26 is a well-known analog interface and has a unidirectional transmitting function which can transfer the image data to only the display unit 28 side. An output display of an image to the projector apparatus 12 by the personal computer 10 can be realized by activating a driver module 17 as an application program developed in the RAM 18 by a print menu. Namely, by the activation of the driver module 17 by the print menu, the MPU 14 develops image information to display by the projector apparatus 12 into the frame memory 20 by bit map data. Subsequently, the image data which was developed as bit map data is read out to the compressing unit 22, for example, on a unit basis of line data in the horizontal direction and is converted to code data by an MMR encoding or the like. The code data is transferred to the projector apparatus 12 through the interface cable 34 by the bidirectional interface 24. In the parallel interface having the bidirectional transmitting function for printer connecting the personal computer 10 and projector apparatus 12, namely, an interface based on the IEEE 1284, a data transfer speed is equal to about 100 kbytes/second. Since a data amount necessary to display an image corresponding to a transfer rate of 300 bps at the A4 size that is displayed by the projector apparatus 12 is equal to about 1 Mbytes, if the data is transferred as it is, it takes a time of about ten seconds. In the image display system of the invention, however, the image data of about 1 Mbytes in the frame memory 20 is MMR encoded and converted into the code data by the compressing unit 22. Therefore, for example, assuming that the compression ratio is ½, the image data can be compressed into the data of about ½, namely, 500 kbytes. Since the display speed of the projector apparatus 12 is equal to, for example, a few seconds per picture plane, the data transfer speed according to the display speed of the projector apparatus 12 can be substantially realized. In the actual MMR encoding, the compression ratio can be set to ½ or less. So long as image data of document data or the like, the compression ratio is further improved and the image data of one picture plane can be transferred to the projector apparatus 12 in one or two minutes. The transfer speed of the image data which is substantially sufficiently higher than the display speed of the projector apparatus 12 can be realized.

The projector apparatus will now be described. An MPU 36 having a system bus 58 and a data bus 60 is provided for the projector apparatus 12. An ROM 38 as a program memory, a bidirectional interface 40 on the display apparatus side of the bidirectional parallel interface for printer, a decoding unit 42, and a frame memory 44 are connected to the MPU 36. The code data from the personal computer 10 received by the bidirectional interface 40 is supplied to the decoding unit 42. The original image data is reconstructed by an MMR decoding and stored into the frame memory 44. The image data stored in the frame memory 44 is read out by a drawing controller 46 and displayed to a display unit 50 through a drive controller 48. The display unit 50 has the liquid crystal panel 52, a line electrode driver 54, and a data electrode device 56. In the invention, a phase transition type liquid crystal panel is used as a liquid crystal panel 52. The panel having the pixels of the number of (2500×3500) pixels or more at the A4 size has been put into practical use at present. In the embodiment, the panel of 4 million pixels (2000×2000 pixels) is used.

Figure 5:
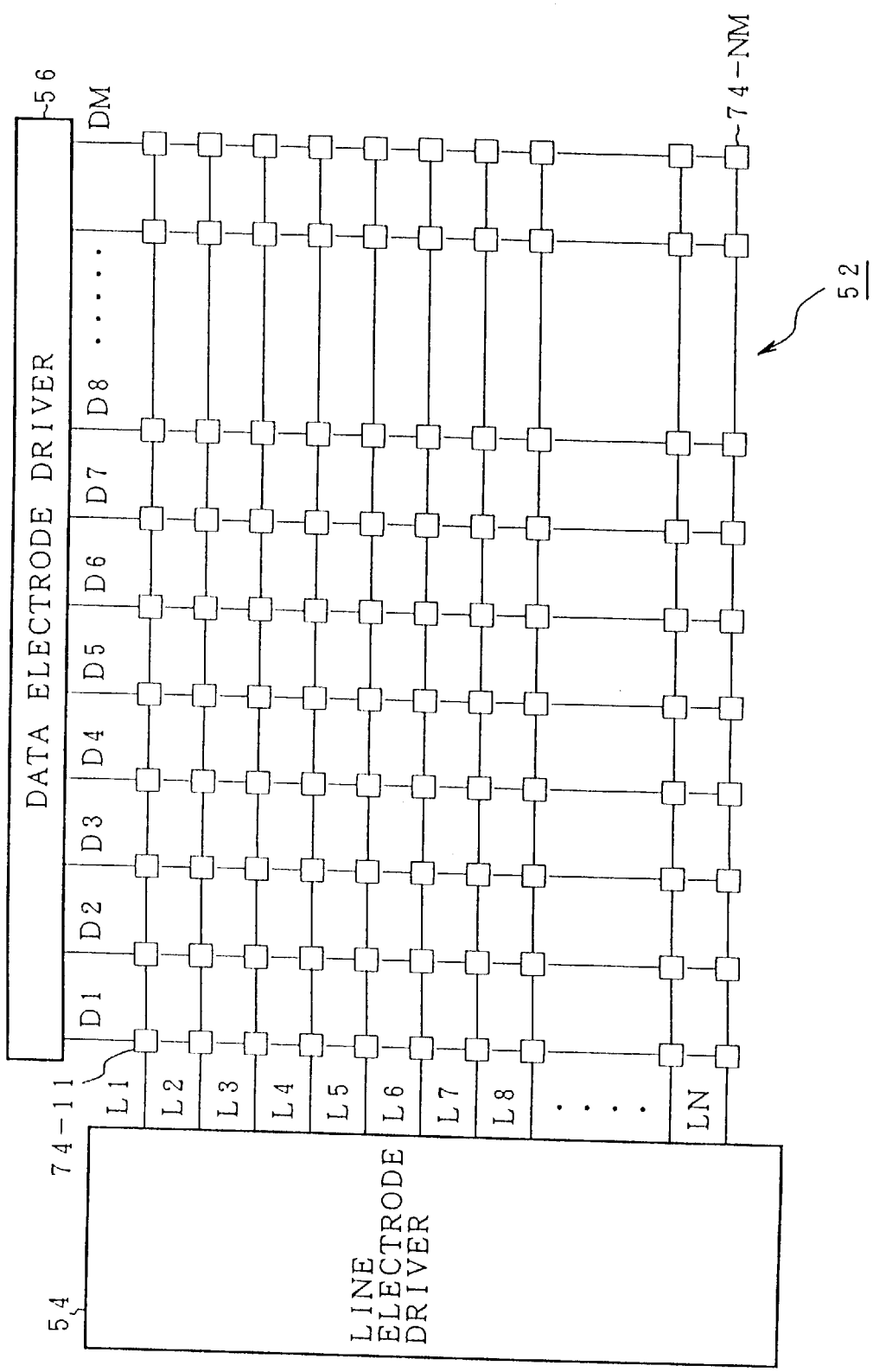
FIG. 5 is a schematic explanatory diagram of a phase transition type liquid crystal panel in FIGS. 4A and 4B.

FIG. 5 shows a schematic diagram of the liquid crystal panel 52 in the display unit 50 in FIGS. 4A and 4B. The phase transition type liquid crystal panel 52 has a device structure of the matrix driving type of (M×N) pixels. Namely, transparent line electrodes L1 to $L_N$ connected to the line electrode driver 54 and data electrodes D1 to $D_M$ connected to the data electrode driver 56 are arranged in a matrix form. A liquid crystal material is sandwiched between the electrodes at an intersecting position of both of them, thereby forming liquid crystal cells 74-11 to 74-NM serving as display pixels. As for the display operation of the phase transition type liquid crystal panel 52, first, one or a plurality of lines are selected from the line electrodes L1 to $L_N$ by the designation of the line numbers for the line electrode driver 54 and line voltages are applied. At the same time, line data of one line, namely, M pixel data is given to the data electrode driver 56 and voltages according to the line pixel data are applied to the data electrodes D1 to $D_M$. For example, the voltage is applied to the data electrode when the pixel data is equal to 1. The applying operation of the voltage is cancelled when the pixel data is equal to 0. When no voltage is applied due to the pixel data "0" on the data electrode driver 56 side, each liquid crystal cell on the line electrode selected by the line electrode driver 56 becomes a cholesteric phase in which the incident light is scattered, so that black in which a light transmittance is low is displayed. When the voltage is applied from the data electrode driver 56 side on the contrary in correspondence to the pixel data "1", each liquid crystal cell is changed to a nematic phase in which the light transmittance is high, so that transparent white is displayed. Therefore, in dependence on the presence or absence of the applied voltage depending on "1" or "0" of the pixel data by the data electrode driver 56 to the liquid crystal cell of the line electrode selected by the line electrode driver 54, the transmittance of the liquid crystal cell is changed and the image is displayed by a dot image. Further, the phase transition type liquid crystal panel 52 has a memory function and can maintain a display state of the display data which has once been written to the liquid crystal cell by applying a holding voltage. Moreover, as a writing operation time, it takes a time of tens of seconds for the writing from black "1" to white "0" which is executed by cancelling the holding voltage. It takes a time of a few milliseconds for the writing from white "0" to black "1" which is executed by applying the holding voltage. Ordinarily, before an image is written, all of the cells of the liquid crystal panel 52 are initialized to white "0". After that, black "1" by the pixel data is written. To initialize the liquid crystal panel 52, namely, to write all cells to white "0", it is sufficient to set the holding voltages of all of the data electrode drivers D1 to $D_M$ by the data electrode driver 56 to 0 volt in a state in which the voltages were applied to all of the line electrodes L1 to $L_N$.

Referring again to FIG. 4, since the liquid crystal panel 52 of a number of pixels having an extremely high display precision such as total 4 million pixels (2000×2000 pixels) as shown in FIG. 5 is provided for the projector apparatus 12, as a projector image 12-1 which is displayed on the screen 15 by the projector apparatus 12 as shown in FIG. 1, an image of an extremely high quality that is almost equivalent to the printer print image of a resolution of 300 dpi can be displayed. Moreover, although the data transfer of about 1 Mbytes per picture plane is executed by using an existing bidirectional parallel interface for printer, when the image data is transferred, by compressing the image data, the data transfer speed is substantially raised. An image of a high quality can be displayed by the projector apparatus 12 without being limited by the data transfer speed.

[High speed display of phase transition type liquid crystal panel]

FIG. 6 shows an embodiment of the drawing controller 46 provided for the projector apparatus 12 in FIG. 4. The writing display by the image displaying method according to the invention is executed to the phase transition type liquid crystal panel 52. The drawing controller 46 is constructed by a timing control unit 78, a display line setting unit 80, a line data storing unit 82, a write line number detecting unit 84, and a frame erasing unit 86. The timing control unit 78 receives a write activation signal E0 from the personal computer 10 side as an upper apparatus and generates timing signals to the drawing controller 46, a memory control unit 76, and further, drive controller 48. When receiving the write activation signal E0, the drawing controller 46 first executes an initialization by the erasure of the whole surface of the liquid crystal panel 52 and, after that, performs the writing display of the image data. Prior to starting the writing operation, the image data has been stored in a display image memory area 44-1 in the frame memory 44. Namely, the frame memory 44 has the display image memory area 44-1 and a work memory area 44-2. The image data has been preserved as original data in the display image memory area 44-1. At the time of the writing operation, the image data is developed in the work memory area 44-2 and a process such as an erasure of the written pixels or the like is executed. The order of write lines for the liquid crystal panel 52 has been preset in the display line setting unit 80 provided for the drawing controller 46. In the embodiment, the display line setting unit 80 sequentially sets the write lines in accordance with the order (ascending order) of the display lines or from the small number of pixels. As for the information of the write line in which the order was set by the display line setting unit 80, each time a timing control signal from the timing control unit 78 is received, the memory control unit 76 is accessed, line data of the image corresponding to the set write line is read out from the work memory area 44-2 in the frame memory 44 and is stored into the line data storing unit 82. At the same time, the same line data is stored in the write line number detecting unit 84. The write line number detecting unit 84 compares the line data which is sequentially read out from the work memory area 44-2 with the line data of the display line which has been stored in the line data storing unit 82 and which is at present a processing target, thereby detecting whether the line data read out to the write line number detecting unit 84 includes the pixel data of the display pixel, namely, black "1" of the line data in the line data storing unit 80. When the line data includes such pixel data, the relevant line is detected as a write line number of this time. In the write line number detecting unit 84, even when the line data that is at present a processing target is stored in the first line data storing unit 82, the same line data is inputted and compared, so that the write number is detected by the write line number detecting unit 84 even with respect to the display line which is at present a processing target. When the line data of the write line as a processing target at present is stored into the line data storing unit 82 and write line number detecting unit 84, if it is detected that the display pixels are not included in the line data, the write line number detecting unit 84 notifies the timing control unit 78 of such a fact and skips the processing routine to the writing process of the next display line without executing the writing process with regard to such a line. When the write line number detecting unit 84 finishes the detection of the write line number including the line data as a processing target at present in the line data storing unit 82, a line data signal E1 and a write line number signal E2 are supplied to the drive controller 48. The line data in the line data storing unit 82 is simultaneously written and displayed to the liquid crystal panel 52 by the driving of the line electrode driver 54 and data electrode driver 56. After completion of the writing of the line data to the liquid crystal panel 52 by the drive controller 48, the frame erasing unit 86 erases the write pixels in the image data stored in the work memory area 44-2 of the frame memory 44 through the memory control unit 76. Such processes are sequentially designated in accordance with the order of the display lines set by the display line setting unit 80. At a time point when no display pixel is left in the work memory area 44-2, the writing display is finished.

Figure 7A:
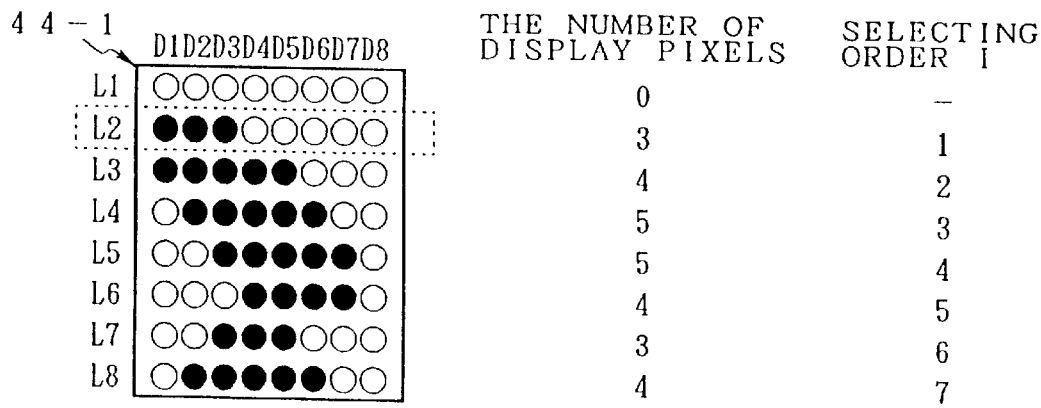
FIGS. 7A to 7G are explanatory diagrams of processing contents of a writing display in FIG. 6.

FIGS. 7A to 7G are operation explanatory diagram of the writing display according to the embodiment of FIG. 6. FIG. 7A shows the display image memory area 44-1 in the frame memory 44. For simplicity of explanation, a case where the liquid crystal panel 52 is constructed by total 64 pixels of (8 lines×8 pixels) is shown as an example. The number of display pixels of display lines L1 to L8 in the image data is equal to "03455434" as shown on the right side. In this case, the display line setting unit 80 sequentially sets a line selecting order in accordance with the order of the line Nos. L1 to L8. When the image data in the display image memory area 44-1 in FIG. 7A is written and displayed to the liquid crystal panel 52, the display line L1 is first set. The line data of the line L1 is read out from the work memory area 44-2 to the line data storing unit 82 and write line number detecting unit 84. However, since no display pixel exists with respect to the line L1, the writing display of the line L1 is not performed but the processing routine advances to the process of the next line L2.

Figure 7B:
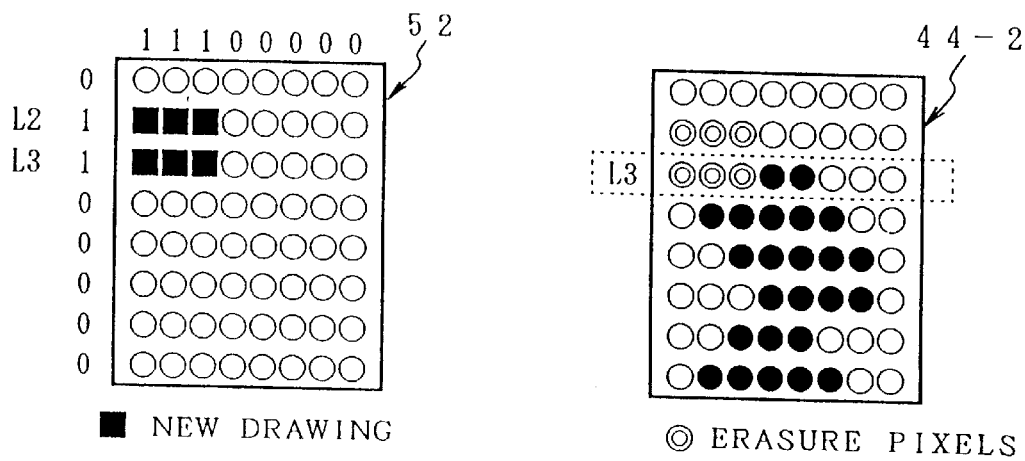
Figure 7C:
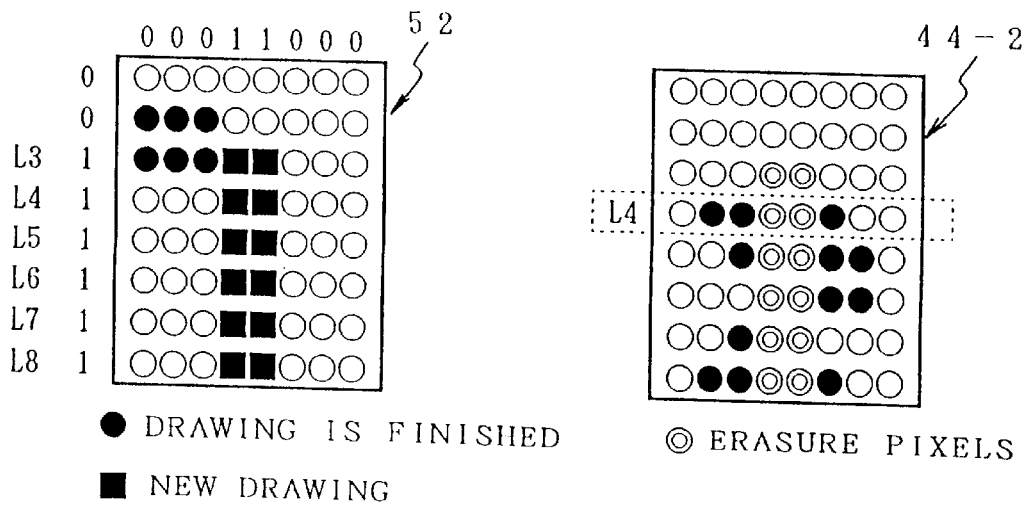

FIG. 7B shows display contents of the liquid crystal panel 52 in the writing display of the line L2 and an erasing state after the data was written into the work memory area 44-2. First, when the line L2 is set as a display line, the line data "11100000" of the line L2 in the same work memory area 44-2 as that of the image data in FIG. 7A is read out and stored into the line data storing unit 82 and, at the same time, it is stored into the write line number detecting unit 84. The first line L2 is detected as a write line. Subsequently, the line data of the next line L3 is read out and compared with the line data of the line L2 by the write line number detecting unit 84. Since the display pixels of the line L2 are included in the line L3, the line L3 is detected as a write line. With respect to the remaining lines L4 to L8, since all of the display pixels of the line L2 which is at present a processing target are not included, those lines are not detected as write lines. Therefore, in the writing operation of the line L2 of the liquid crystal panel 52, two lines of the write line Nos. L2 and L3 are designated, the data electrodes D1, D2, and D3 as display pixels of the line L2 are set to "1", and a voltage is applied, so that data is newly written to the liquid crystal panel 52. After completion of the writing, three display pixels of each of the lines L2 and L3 are erased as shown in the work memory area 44-2 in FIG. 7B. After completion of the erasure, the next line L3 is set by the display line setting unit 80 and the writing display by the line data "00011000" of the line L3 in FIG. 7C is executed. Since the display pixels of the line data "00011000" of the line L3 are included in the lines L4 to L8, those line numbers are detected. The same line data is simultaneously written to six lines of L3 to L8. The written pixels are erased as shown in the work memory area 44-2 in FIG. 7C and the next line L4 is set.

Figure 7D:
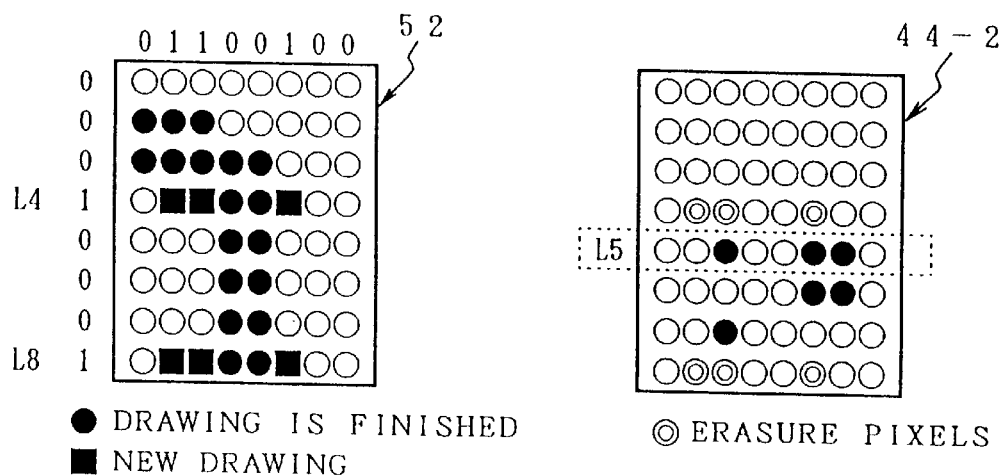
Figure 7E:
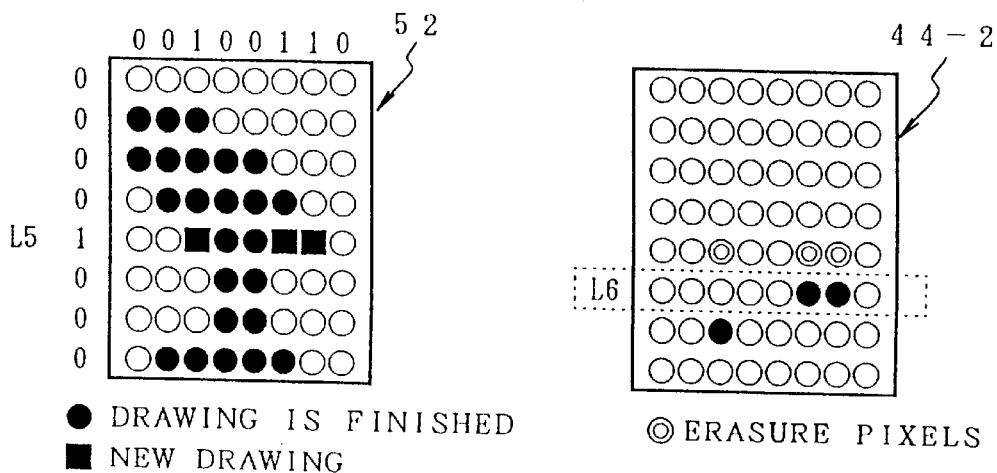
Figure 7F:
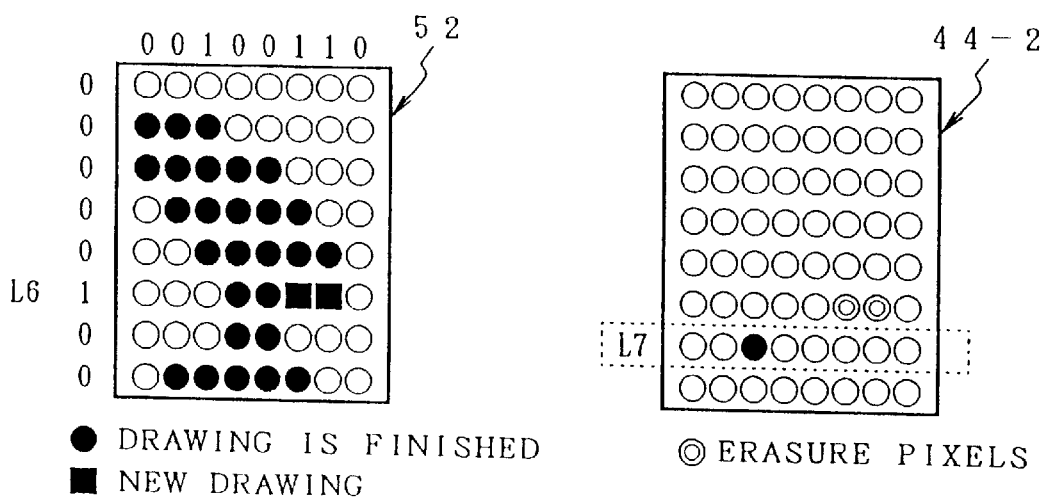
Figure 7G:
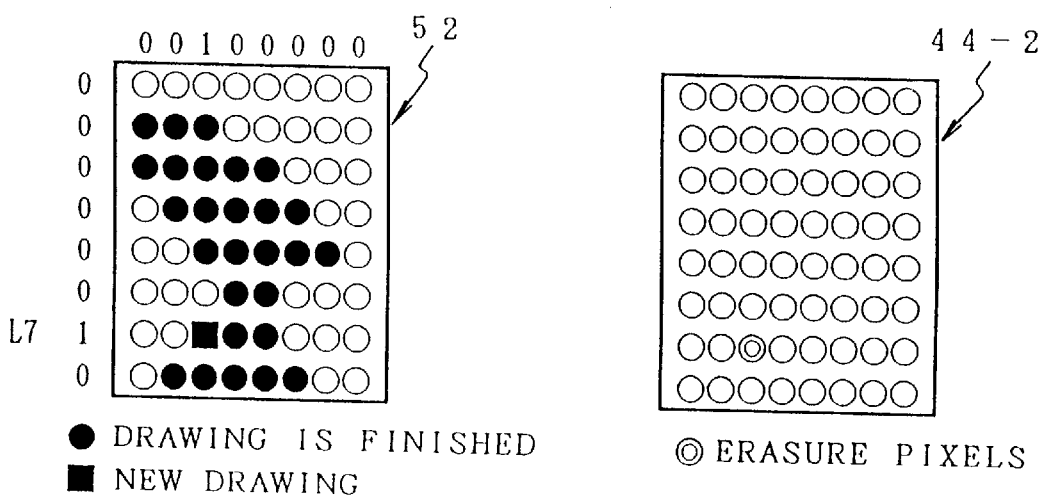

FIG. 7D shows the writing display by the setting of the line L4. In this case, the line L8 is detected in addition to the line L4 and the same line data is written to two lines of L4 and L8. After the display pixels were erased, the next line L5 is set. FIG. 7E shows the writing display of the line L5. In this case, the other lines are not detected but the writing display of only the line L5 is performed. After the display pixels were erased, the next line L6 is set. FIG. 7F shows the writing display of the line L6. In this case as well, the other lines are not detected and the writing display of only the line L6 is executed. After the display pixels were erased, the next line L7 is set. FIG. 7G shows the writing display of the line L7. By such a writing operation, all of the display pixels in the work memory area 44-2 are erased and the writing process is finished.

Figures 8A, 8B:
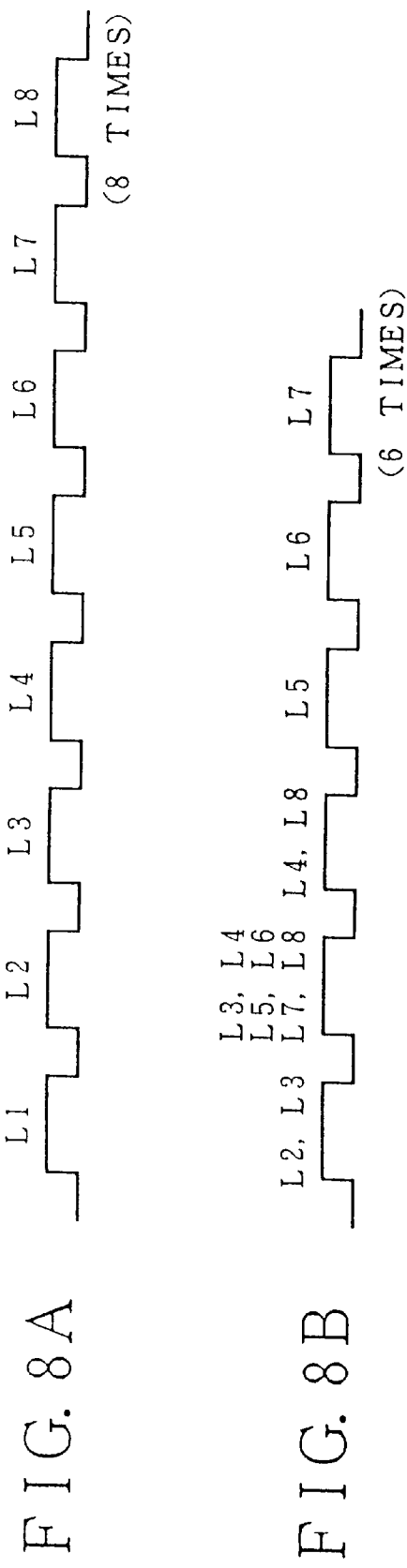
FIGS. 8A and 8B are timing charts showing the number of times of the writing display operation in FIG. 6 in comparison with the conventional one.

FIGS. 8A and 8B are timing charts of the writing display according to the embodiment of FIG. 6 in comparison with the conventional writing display. FIG. 8A shows the conventional writing display and the writing display of each of the eight display lines L1 to L8, namely, the writing displays of eight times are necessary. On the other hand, FIG. 8B shows the writing display according to the embodiment of FIG. 4 and the number of times of the writing can be reduced to six times by the simultaneous writing of a plurality of lines.

In association with the progress of the number of times of the writing display in the liquid crystal panel 52 as shown in FIGS. 7A to 7G, at the stages of FIGS. 7B and 7C as a writing initial stage, the schematic writing display of the display image of FIG. 7A is executed and, after that, the writing display by the detailed additional writing of FIGS. 7D to 7G is performed. Therefore, the partial pixel display of almost all of the lines is executed by, for example, the writing operation of about two times as shown in FIGS. 7B and 7C and the outline of the display picture plane can be recognized. Thus, at the time of the retrieving work by the switching of the picture plane, the contents can be grasped by the outline display at the initial stage of the writing display. The necessary retrieval picture plane can be promptly switched and discriminated. When the target retrieval picture plane is obtained, it is sufficient to display until the end.

FIG. 9 is a flowchart for the writing display process in the embodiment in FIG. 6. First in step S1, the line number (n) to set the line as a processing target is initialized to (n=1). In step S2, the line data of the line (n) is read out. In step S3, a check is made to see if the line data of the read-out line (n) includes the display pixels. When it doesn't include any display pixel, the processing routine skips to step S7 and the writing display of this line is not performed but the line number is increased to the next line number. When the line data includes the display pixels, step S4 follows and the other lines including the read-out line data are detected and selected from the image data. In step S5, the data of the display pixels of the selected line is erased from the image data. In step S6, with respect to the selected line number, the line data which is at present being processed is simultaneously written to the liquid crystal panel. After completion of the writing, the line number is increased by "1" in step S7. When the line is not the final line in step S8, the processing routine is again returned to step S3 and the writing display of the next line is executed. In the processes in FIG. 9, before the simultaneous writing of the line data for the detected write lines is executed to the liquid crystal panel in step S6, the display pixels are erased from the frame memory. However, the processing contents are substantially the same even if steps S5 and S6 are exchanged.

Figure 10A:
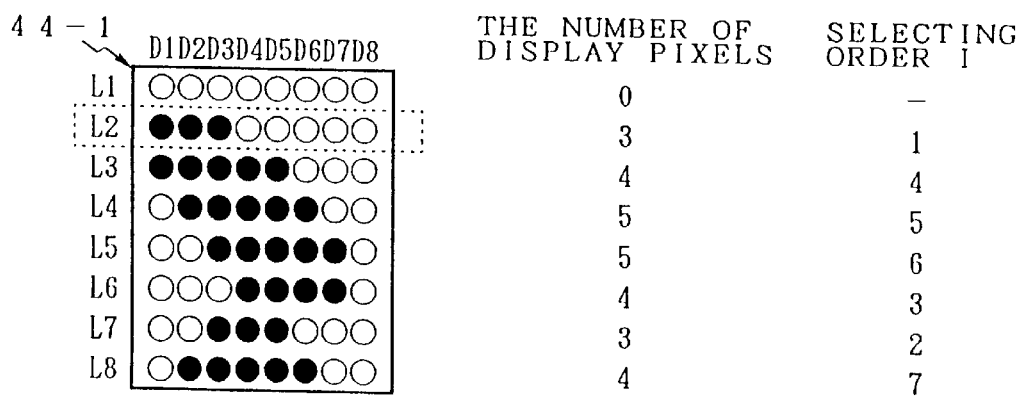
FIGS. 10A to 10E are explanatory diagrams of processing contents of the writing display in FIG. 6 which is processed in accordance with the line order from the line of the small number of pixels.
Figure 10B:
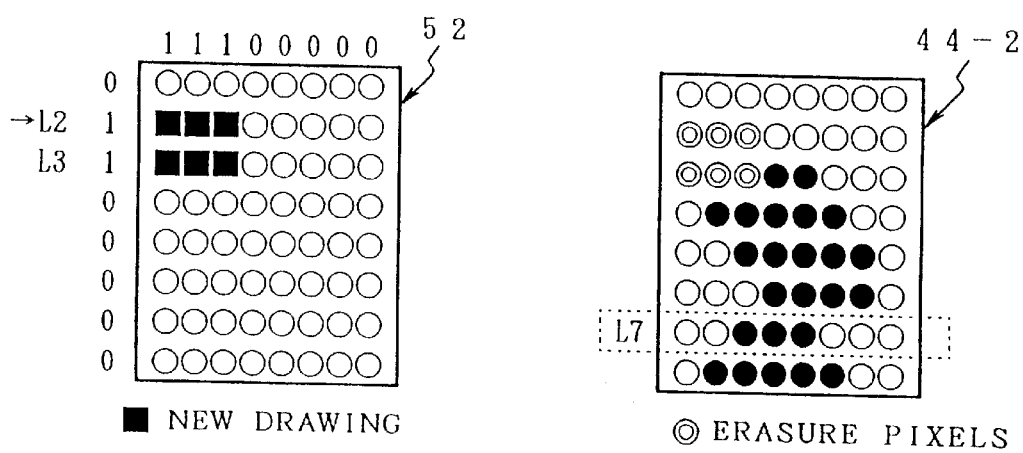
Figure 10C:
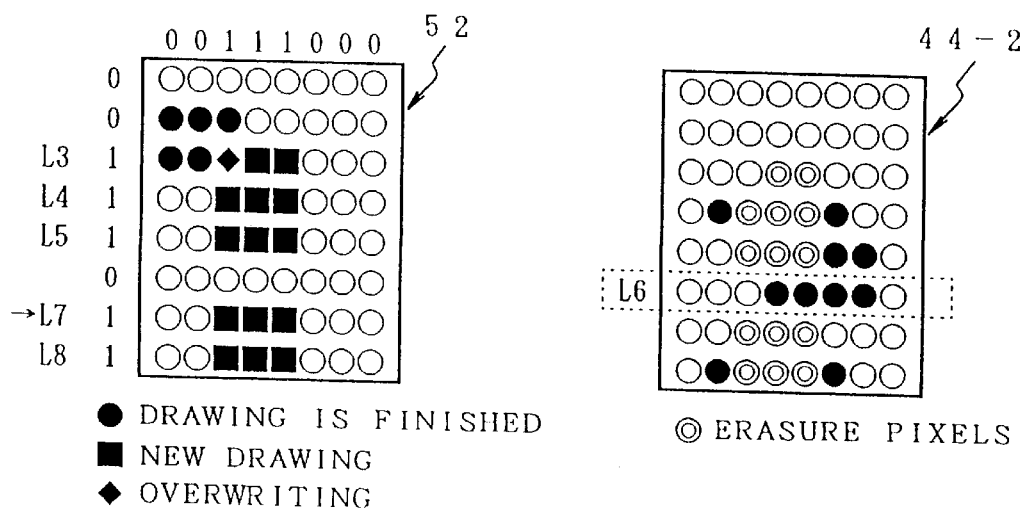
Figure 10D:
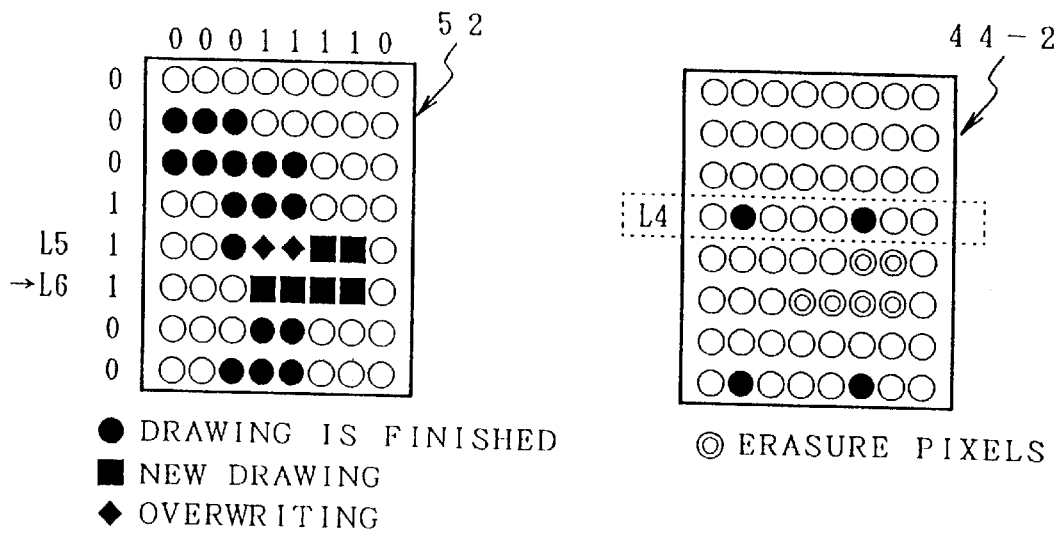
Figure 10E:
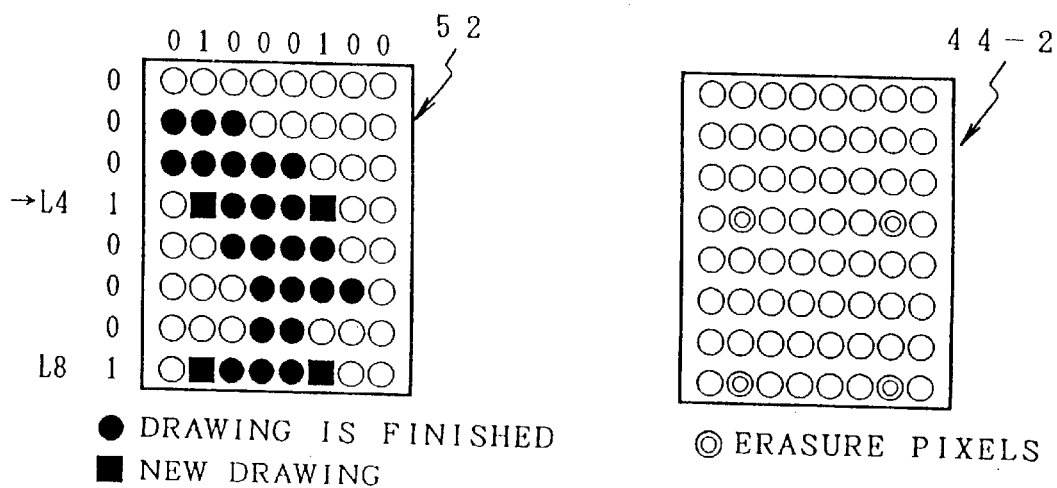

FIGS. 10A to 10E show other processing forms of the drawing controller 46 provided on the projector apparatus 12 side in FIG. 6 and are characterized in that the orders of the display lines to be written and displayed are sequentially set in accordance with the small number of pixels of the line data. The other construction and functions are substantially the same as those in the embodiment for sequentially processing in accordance with the order of the lines. First, image data as shown in FIG. 10A has been transferred from the personal computer 10 side as an upper apparatus and stored in the display image memory area 44-1 of the frame memory 44. When receiving the write activation signal E0, the drawing controller 46 first activates the display line setting unit 80, sequentially reads out the line data from the display image memory area 44-1 in the frame memory 44, and counts the number of pixels of each line. In FIG. 10A, for simplicity of explanation, a display writing of 64 pixels (8 lines×8 pixels) is shown as an example. In this case, as shown on the right side, the number of display pixels of the lines L1 to L8 is equal to "03455434" and is detected by the display line setting unit 80. When the number of display pixels can be detected as mentioned above, the selecting order is set to the order from the small number of display pixels. Since the line L1 has no display pixel, it is excluded from the targets of the order setting process. With regard to the remaining lines L2 to L8, the selecting orders are set to L2, L7, L6, L3, L4, L5, and L8, respectively. When the numbers of display pixels are equal, the line of the smaller line number is preferentially set. After completion of the setting of the selecting orders of the lines for the writing display as mentioned above, the writing displays of FIGS. 10B to 10E are executed in accordance with the selecting orders. FIG. 10B shows the writing display to the liquid crystal panel 42 of the line data of the line L2 having the selecting order No. 1 in FIG. 10A. In this case, the line L3 having the same data is detected and the simultaneous writing is executed. The display pixels of the lines L2 and L3 are erased as shown in the work memory area 44-2 in FIG. 10 and the line L7 having the selecting order No. 2 is subsequently set. FIG. 10C shows the writing display of the line L7 and the lines L4, L5, and L8 including the display pixels of the line data of the line L7 are detected. In the embodiment, with respect to the line data "00111000" of the line L7 as a processing target at present, it is compared with the original data of the lines L2 and L3 which has already been written, namely, the line data stored in the display image memory area 44-1 in FIG. 6. In this case, since the line L3 includes the same display pixels as those of the line L7 as a processing target at present, it is detected as a write line. Therefore, in the simultaneous writing using the line data of the line L7, the line data is simultaneously written with respect to five lines of L3, L4, L5, L7, and L8. In this instance, since the third pixel of the line L3 has already been written at the first time in FIG. 10B, it is overwritten. When the display writing is finished, the display pixels are erased as shown in the work memory area 44-2 in FIG. 10C and the next line L6 having the selecting order No. 3 is designated. FIG. 10D shows the writing display of the line L6. In this case, with respect to the image data in which the display pixels written in the work memory area 44-2 in FIG. 10C have already been erased, although the other lines including the same line data don't exist, by referring to the image data of FIG. 10A as original image data, it will be understood that the same data is partially included in the line L5. In this case, therefore, the lines L6 and L5 are detected and the simultaneous writing using the line data of the line L6 is performed. Therefore, since the line data has already been written with respect to the line L5, a part of the data is overwritten. After completion of the overwriting, as shown in the work memory area 44-2 in FIG. 10D, the display pixels which were newly drawn are erased and the next line L3 having the selecting order No. 4 is set. However, since the line L3 includes no display pixel, the next line L4 having the selecting order No. 5 is set. Since the display pixels exist in the line L4, the display writing in FIG. 10E is executed. In the display writing, the line L8 is detected and the line data is simultaneously written to two lines of L1 and L8 using the line data of the line L4. In association with the writing, all of the display pixels are erased by the erasure of the pixels in the work memory area 44-2 in FIG. 10E and the writing procedure is finished.

FIGS. 11A and 11B are timing charts showing the writing display of the invention which is sequentially executed in accordance with the order from the small number of pixels in comparison with the conventional writing display. As compared with 8 times in the conventional writing in FIG. 11A, according to the writing of the order from the small number of pixels in FIG. 15B, the writing display can be finished by 4 times, that is the half of the 8 times.

FIG. 12 is a flowchart for the image display control in which the orders of the display lines are sequentially set in accordance with the order from the small number of pixels. First in step S1, the number of pixels of each line of the image data is counted. In step S2, the lines are sequentially read out in accordance with the order from the small number of display pixels. In step S3, the lines including the line data of the line (n) which is at present being processed are selected and detected. In step S4, the data of the display pixels of the line (n) is erased from the selected lines of the image data in the work memory area. After that, in step S5, the line data that is at present being processed is simultaneously written to the plurality of selected lines. In step S6, the above processes are repeated until all lines are displayed.

[Display control of two picture planes of projector]

Figure 13:
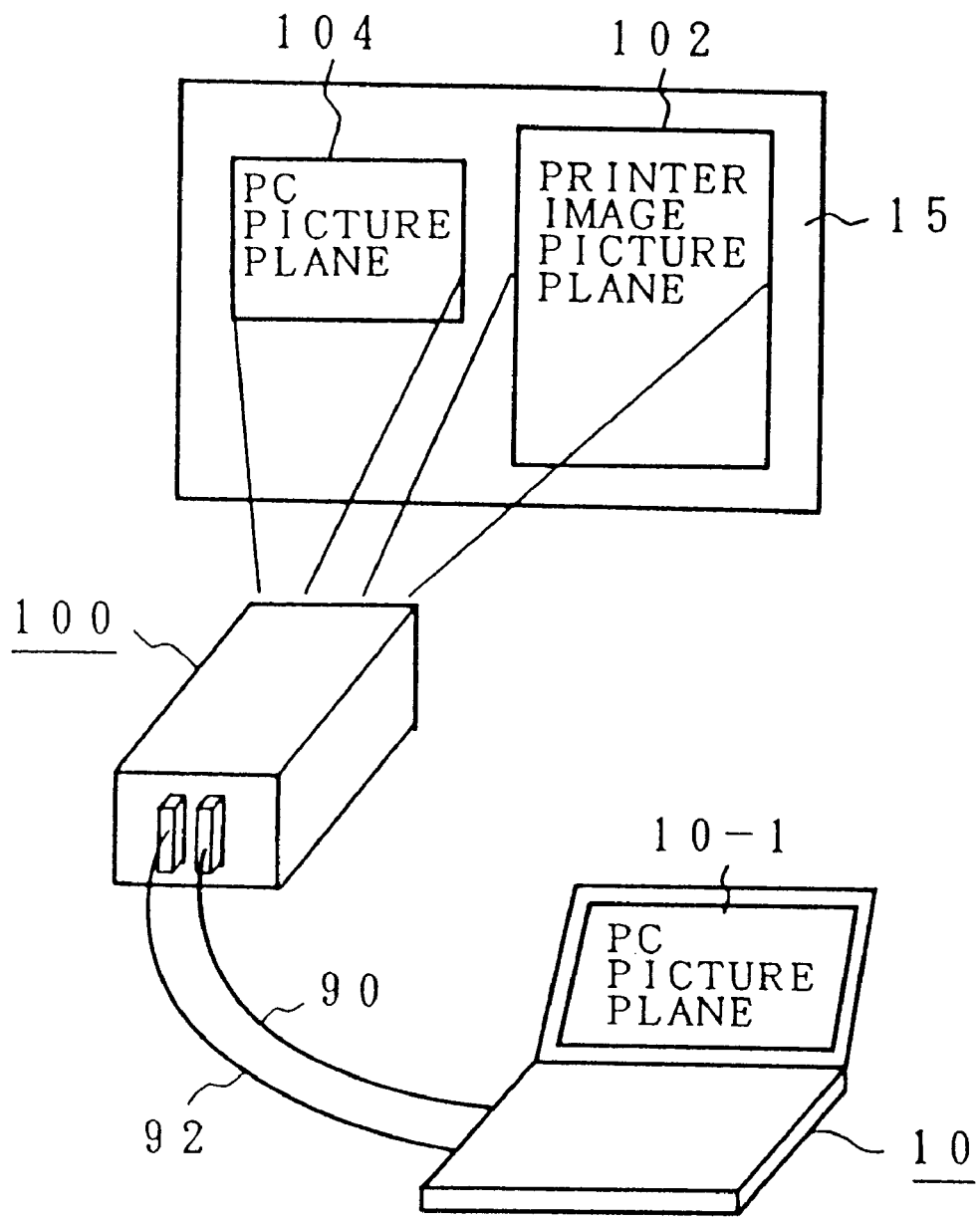
FIG. 13 is an explanatory diagram of an embodiment of the invention for displaying two picture planes onto a screen.

FIG. 13 shows another embodiment of an image display system of the invention. The embodiment is characterized in that a printer image picture plane of a high quality similar to that of the printer print image and a PC picture plane as a display picture plane of the personal computer can be simultaneously displayed on the screen by the projector apparatus. The image display system is constructed by the personal computer 10 as an upper apparatus and a projector apparatus 100 having a 2-picture plane display function. The projector apparatus 100 is connected to the personal computer 10 by a bidirectional interface cable 90 for printer and a unidirectional interface cable 92 for display. The projector apparatus 100 can simultaneously display a printer image picture plane 102 having a resolution of total 4 million pixels (2000×2000 pixels) and a PC picture plane 104 having pixels of the number within a range from about 0.3 million pixels (640×480 pixels) to about 1 million pixels (1280×1024 pixels) which is the same as that of the liquid crystal display 10-1 provided for the personal computer 10 onto the screen 15. As a PC picture plane 104, the display picture plane on the liquid crystal display 10-1 of the personal computer 10 can be displayed as it is.

Figure 14:
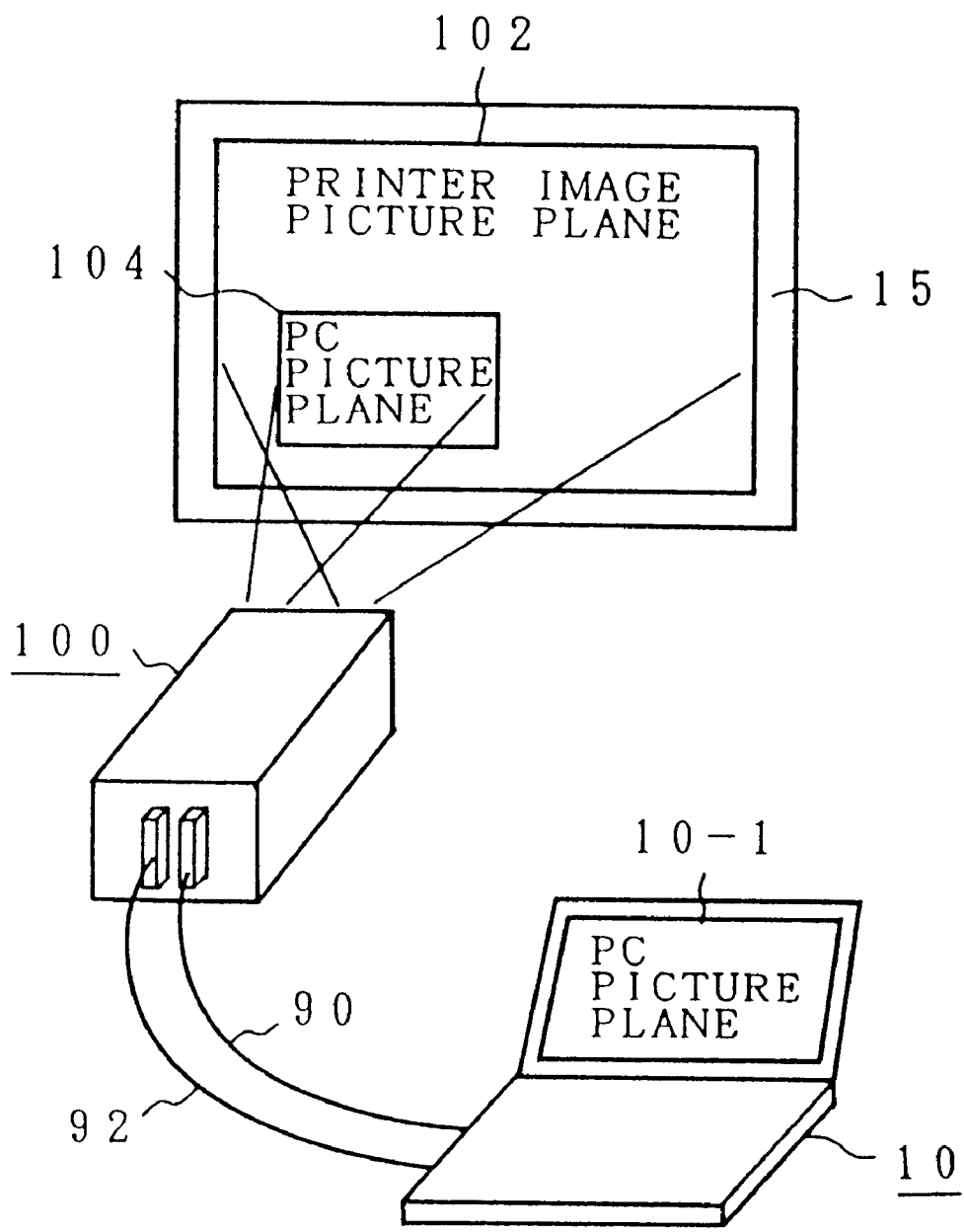
FIG. 14 is an explanatory diagram of another display form of FIG. 13.

FIG. 14 shows another display form by the projector apparatus 100 in the embodiment of FIG. 13. In the embodiment, the printer image picture plane 102 having a resolution of 4 million pixels is displayed on the whole screen 15 and the PC picture plane 104 having a resolution of about 0.3 to 1 million pixels is displayed so as to overlap to a part of the printer image picture plane 102. A size of printer image picture plane 102 on the screen 15 can be properly adjusted by changing a projection magnification in the projector apparatus 100. Although a size of PC picture plane 104 can be also similarly changed by changing the projection magnification, the PC picture plane 104 is fundamentally the picture plane of the same size as that of the liquid crystal display 10-1 of the personal computer 10. Therefore, the PC picture plane 104 can have a fixed size. The PC picture plane 104 can be obviously moved to an arbitrary position on the screen 15.

Figure 15:
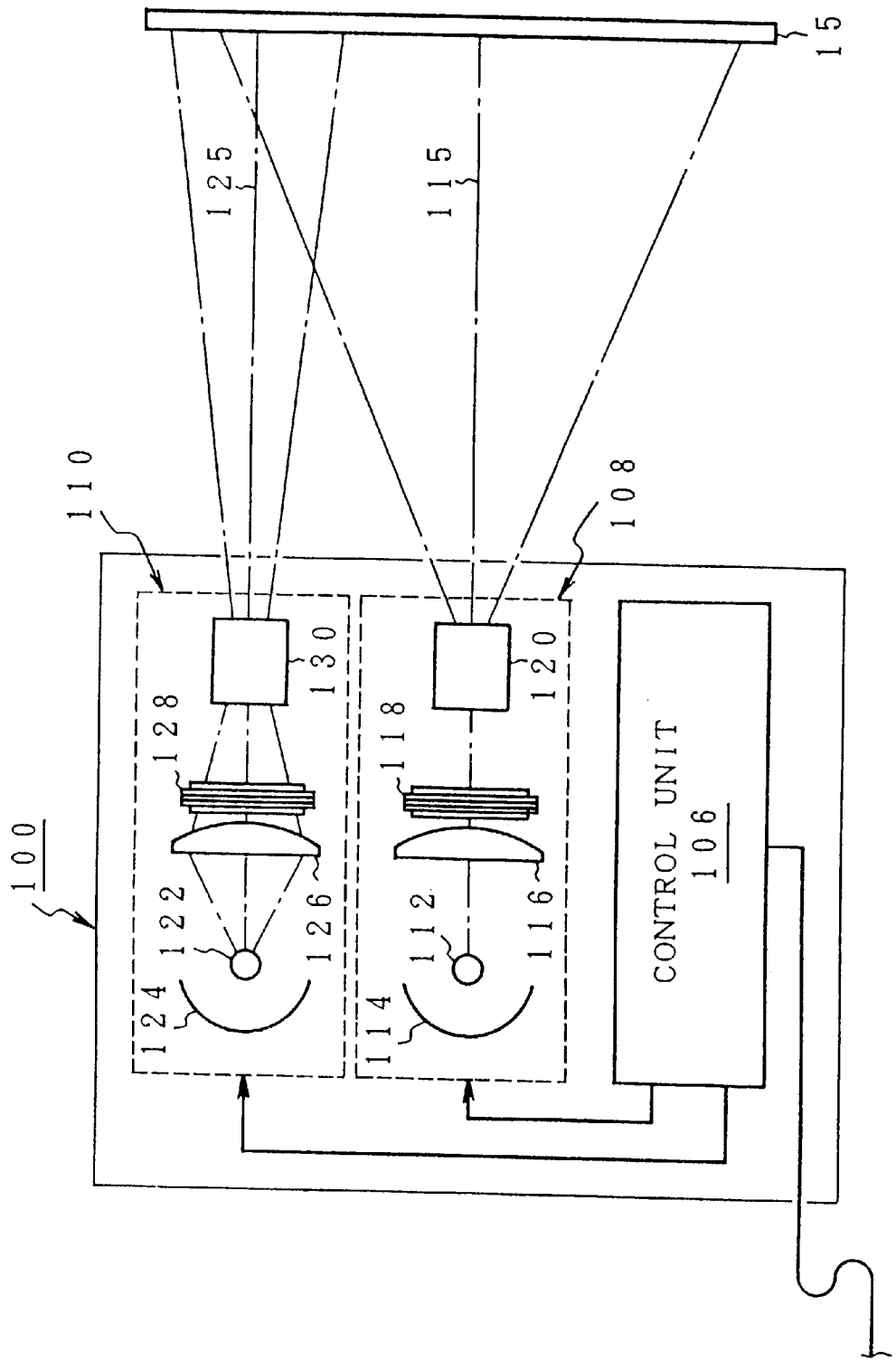
FIG. 15 is an explanatory diagram of a projector apparatus of FIG. 13.

FIG. 15 shows an embodiment of the projector apparatus 100 of FIG. 13 and relates to a projection display of a monochromatic image as an example. A control unit 106, a first optical unit 108, and a second optical unit 110 are provided for the projector apparatus 100. The first optical unit 108 is constructed by a light source 112, a deflector 114, a condenser lens 116, a liquid crystal panel 118, and a projection lens 120 and displays a printer image picture plane having a resolution of 4 million pixels onto the screen 15 by an optical axis 115. The liquid crystal panel 118 of the first optical unit 108 is the same phase transition type liquid crystal panel of FIG. 5 as the liquid crystal panel 52 provided for the projector apparatus 12 in FIG. 1. The second optical unit is constructed by a light source 122, a deflector 124, a condenser lens 126, a liquid crystal panel 128, and a projection lens 130 and projects and displays the PC picture plane onto the screen 15 in the direction of an optical axis 125. The liquid crystal panel 128 of the second optical unit 110 is a TFT type liquid crystal panel and uses pixels of the number about within a range from 0.3 to 1 million pixels. The first and second optical units 108 and 110 can adjust the directions of the optical axes 115 and 125 in the vertical and lateral directions as necessary, respectively.

Figure 16:
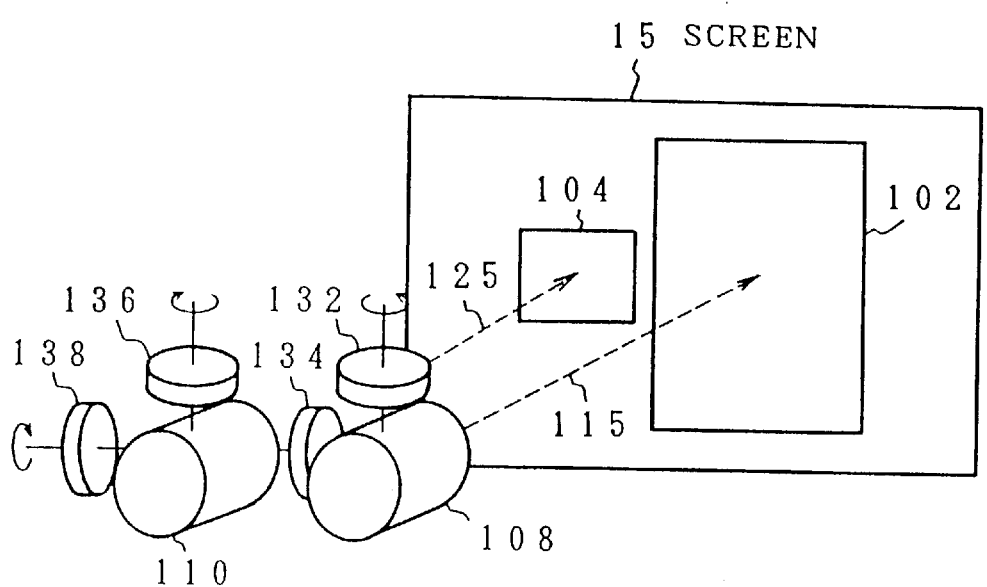
FIG. 16 is an explanatory diagram of an adjusting mechanism of an optical unit provided for the projector apparatus.

FIG. 16 shows an outline of the optical unit of FIG. 15. The optical axial direction can be adjusted by a motor driving based on a direction operating switch provided for the projector apparatus. First, a horizontal turning motor 132 and a vertical turning motor 134 are provided for the first optical unit 108. The corresponding motor is rotated around the horizontal and vertical planes by the adjustment of the direction by the operator and the optical axis 115 is adjusted in the vertical and lateral directions on the screen 15, thereby enabling the printer image picture plane 102 to be displayed at an arbitrary position. The second optical unit 110 also similarly has a horizontal turning motor 136 and a vertical turning motor 138. The second optical unit 110 is rotated around the horizontal and vertical planes by the motor driving in accordance with the operations of the direction adjusting switches by the operator, thereby enabling the PC picture plane 104 to be displayed while setting the optical axis 125 to an arbitrary position on the screen 15.

Figure 17:
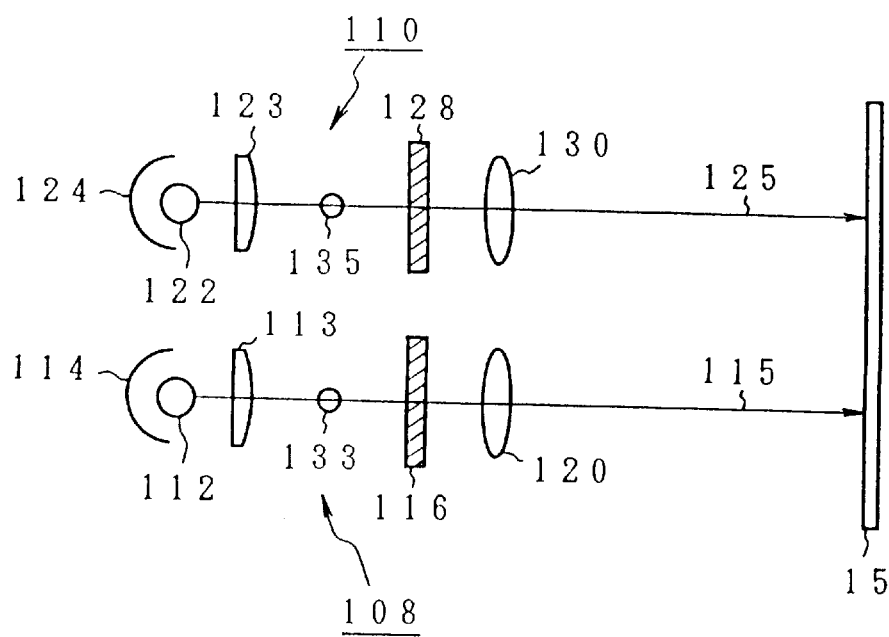
FIG. 17 is an explanatory diagram of an adjusting state of an optical unit for displaying two picture planes in parallel onto the screen.
Figure 18:
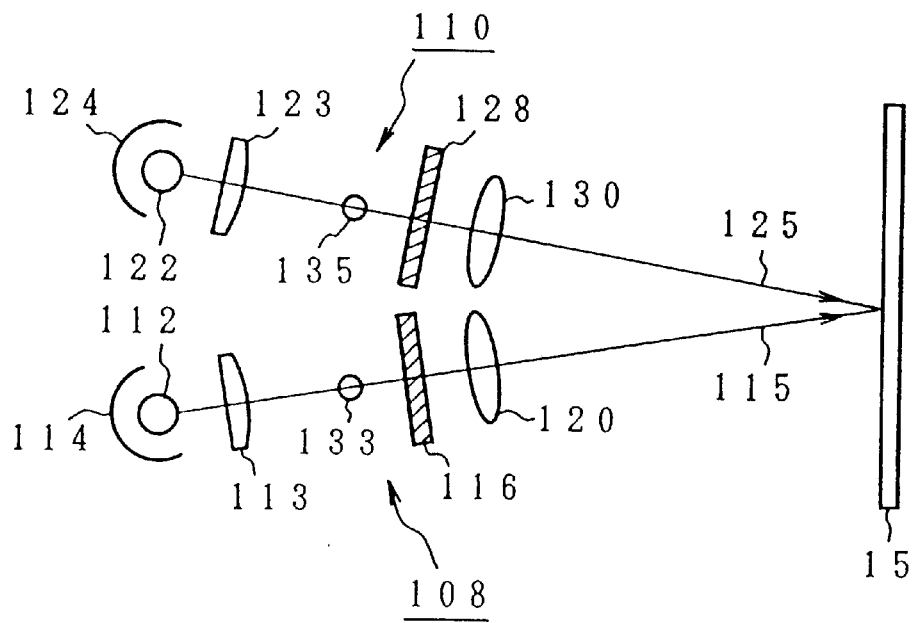
FIG. 18 is an explanatory diagram of an adjusting state of an optical unit for overlappingly displaying two picture planes onto the screen.

FIG. 17 is a schematic plan view for explaining the optical axial adjustment of FIG. 16. The first and second optical units 108 and 110 can be turned horizontally around axes 133 and 135, respectively. Therefore, as shown in FIG. 16, when the operator wants to display the printer image picture plane 102 and PC picture plane 104 in parallel on the screen 15, it is sufficient to set the optical axes 115 and 125 of both of those picture planes into, for example, a parallel state as shown in the diagram. When the operator wants to overlappingly display the PC picture plane 104 into a part of the printer image picture plane 102 as shown in FIG. 14, it is sufficient to respectively rotate the first and second optical units 108 and 110 around the axes 133 and 135 as shown in FIG. 18 and to operate the optical units in an arbitrary direction so that the optical axes 115 and 125, for example, coincide on the screen 15. Although the adjusting mechanism in FIG. 16 has been shown and explained with respect to the motor mechanism as an example, the directions of the optical axes 115 and 125 of the first and second optical units 108 and 110 can be also directed to an arbitrary position on the screen 15 by a rotating operation of adjustment knobs by the operator.

Figure 19:
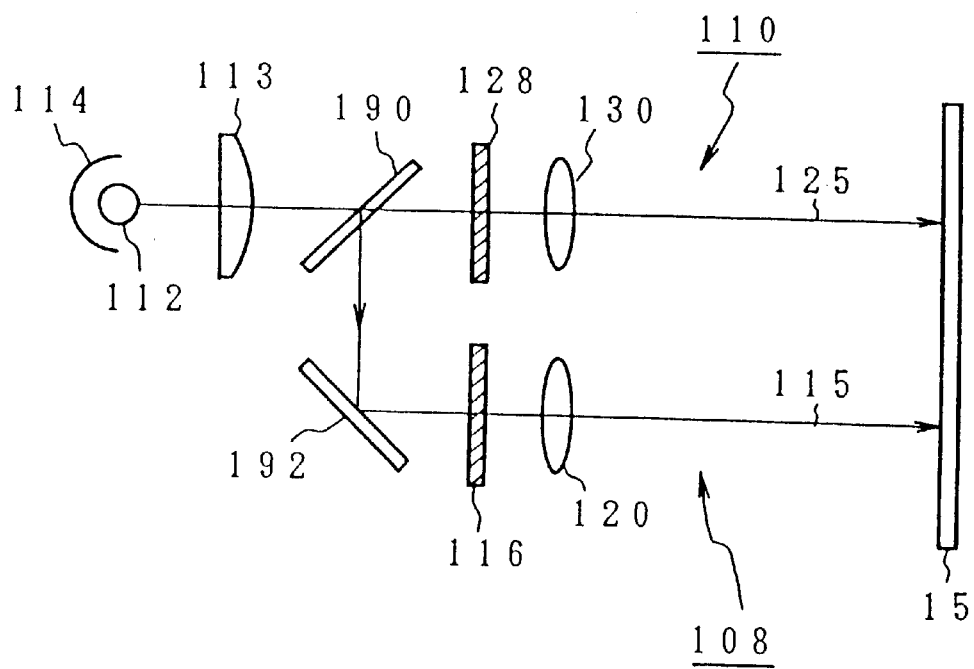
FIG. 19 is an explanatory diagram of another embodiment of an optical unit for displaying two picture planes onto the screen.

FIG. 19 shows another embodiment of the first and second optical units 108 and 110 which are used in the projector apparatus 100 in FIG. 13 and is characterized in that the light source is commonly used. Namely, the light source 112 is provided as a common light source for the first and second optical units 108 and 110. The light from the light source 112 obtained through a condenser lens 113 is inputted to the second optical unit 110 by a half mirror 190. The light branched by the half mirror 190 is reflected by a mirror 192 and is inputted to the first optical unit 108. To change the positions of the optical axes 115 and 125 for the screen 15, for example, it is sufficient to move projection lenses 120 and 130 in the direction which perpendicularly crosses the optical axes. However, when movement amounts of the projection lenses 120 and 130 are large, a distortion of the image on the screen 15 is enlarged due to a deviation of the optical axes. Therefore, movement ranges of the projection lenses 120 and 130 are suppressed within a range where the distortion of the image is inconspicuous.

Figure 20B:
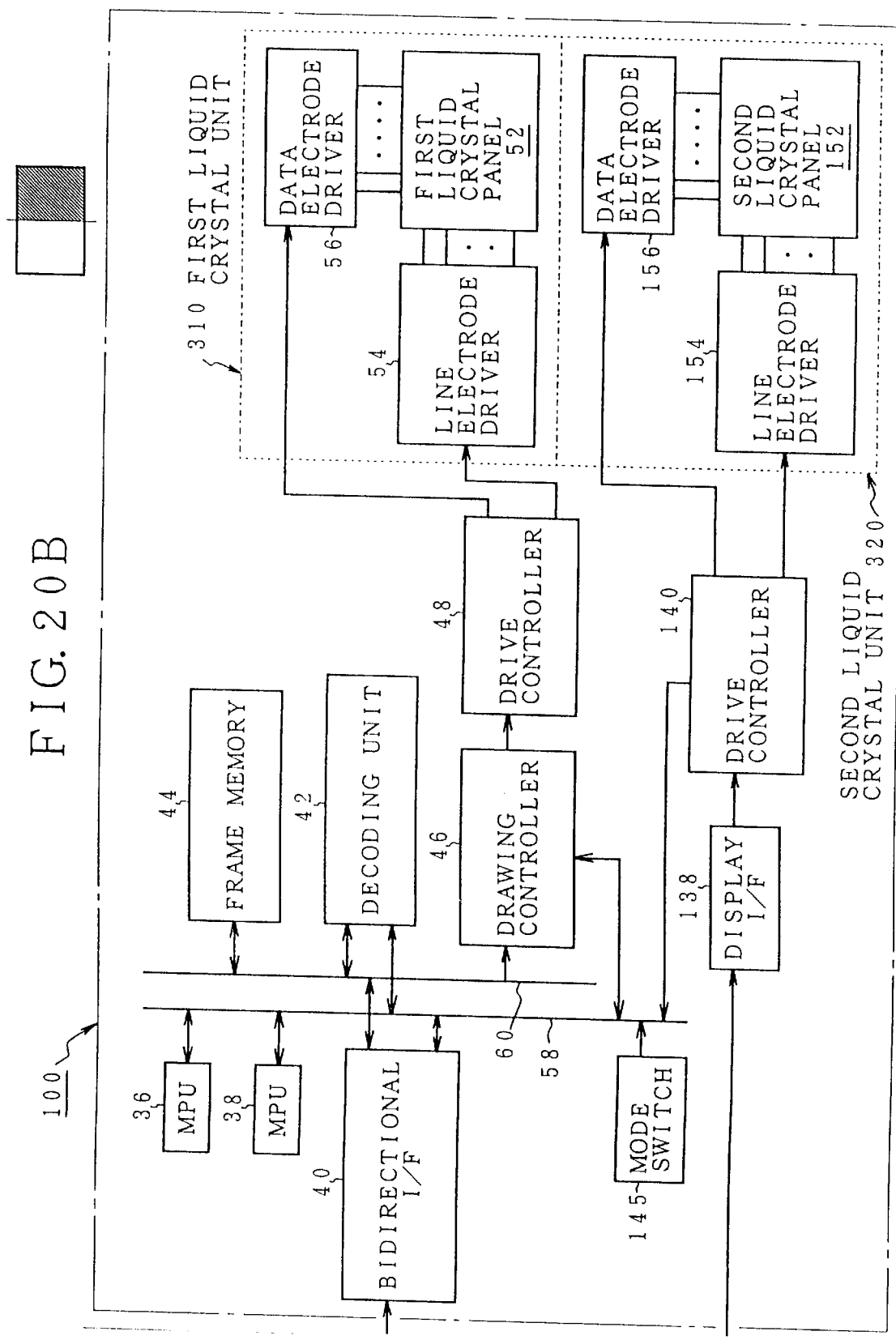

FIGS. 20A and 20B are block diagrams of an embodiment of a circuit construction of the personal computer 10 and projector apparatus 100 in the embodiment of FIG. 13. Although the personal computer 10 is fundamentally the same as that in the embodiment of FIG. 4, in addition to it, a display interface 236 having an analog unidirectional transmitting function to transfer the image data of the display image of the display unit 28 is provided for the projector apparatus 100. The projector apparatus 100 is connected to the display interface 236 through the unidirectional interface cable 92 for display. In the projector apparatus 100, the display unit 50 in FIG. 4 is used as a first liquid crystal unit 310 and, further, a second liquid crystal unit 320 is newly provided. The first liquid crystal unit 310 uses a liquid crystal panel of a number of pixels having a high resolution of 4 million pixels (2000×2000 pixels) of the phase transition type in FIG. 5 as a first liquid crystal panel 52. On the other hand, the second liquid crystal unit 320 has a second liquid crystal panel 152. The second liquid crystal panel is, for example, a TFT type liquid crystal panel and uses pixels within a range from 0.3 million pixels (640×480 pixels) to 1.3 million pixels (1280×1024 pixels). It is desirable to set the number of pixels of the second liquid crystal panel to the same number as that of the TFT liquid crystal panel used in the display unit 28 of the personal computer 10. A line electrode driver 154 and a data electrode driver 156 are provided for the liquid crystal panel 152. The image data for the display of the PC picture plane by the unidirectional interface cable 92 for display to which the personal computer 10 is connected is received by a display interface 300, is inputted to a display controller 140, and drives the second liquid crystal unit 320, thereby displaying the image of the PC picture plane. As a display controller 140, the same controller as that provided for the display unit 28 of the personal computer 10 is used. Further, a mode switch 145 is provided for the system bus 58 of the MPU 36 of the projector apparatus 100. The mode switch 145 switches the following three display modes.

Mode 1: Simultaneous display of the printer image picture plane and the PC picture plane Mode 2: Display of only the printer image picture plane Mode 3: Display of only the PC picture plane Specifically speaking, when mode 1 is set by the mode switch 145, both of the drawing controller 46 and display controller 140 operate and the display of the printer image picture plane by the drawing of the first display unit 310 and the display of the PC picture plane by the drawing of the second liquid crystal unit 320 are executed. When mode 2 is set by the mode switch 145, the drawing controller 46 operates, the display controller 140 is turned off, and only the printer image picture plane is displayed by the first liquid crystal unit 310. Further, when mode 3 is selected by the mode switch 145, the display controller 140 operates, the drawing controller 46 is turned off, and only the PC picture plane is displayed by the second liquid crystal unit 320.

Figure 21A:
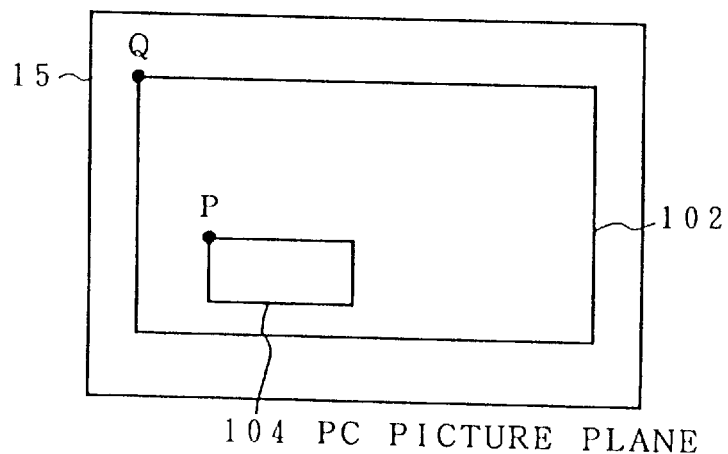
FIGS. 21A to 21C are explanatory diagrams of an overlap display of a PC picture plane to a printer image picture plane on the screen.
Figure 21B:
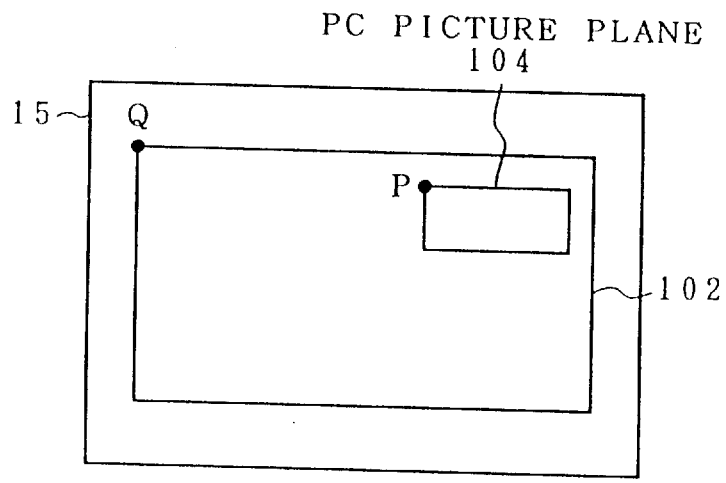
Figure 21C:
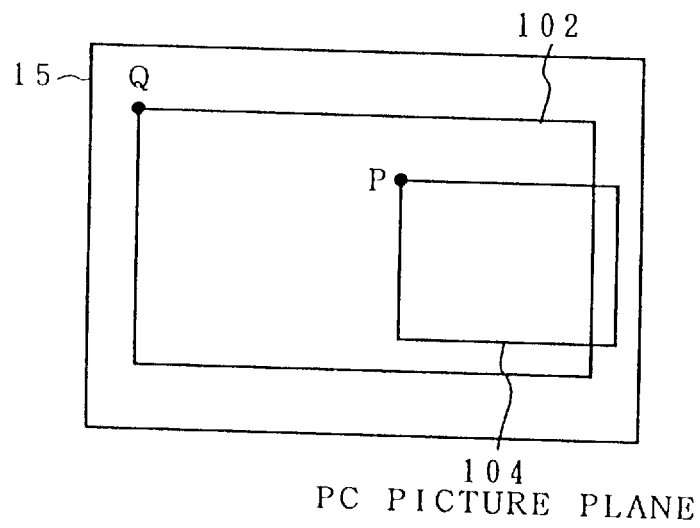

Explanation will now be made with respect to an overlap display process when mode 1 is set by the mode switch 145 in the projector apparatus 100 in FIG. 20A and both of the printer image picture plane and the PC picture plane are simultaneously displayed. FIGS. 21A to 21C show display examples of the PC picture plane 104 to the printer image picture plane 102 displayed on the screen 15. FIG. 21A displays the PC picture plane to the left lower corner of the printer image picture plane 102. FIG. 21B displays the PC picture plane 104 to the right upper corner of the printer image picture plane 102. Further, FIG. 21C enlargedly displays the PC picture plane 104. A display position of the PC picture plane 104 to the printer image picture plane 102 on the screen 15 as mentioned above is fundamentally set on the screen 15. In this case, as a reference point for positioning, for example, the left upper corner of the printer image picture plane 102 is set to an origin Q. Similarly, with respect to the PC picture plane 104 as well, the left upper corner is set to an origin P. Therefore, the position of the PC picture plane 104 on the printer image picture plane 102 can be set by coordinate values of the origin P of the PC picture plane 104 for the two-dimensional coordinates of the printer image picture plane in which the point Q is set to the origin.

When the PC picture plane 104 is overlappingly displayed in the printer image picture plane 102 as shown in FIGS. 21A to 21C, if the image of the printer image picture plane 102 is displayed as it is with respect to the display portion of the PC picture plane 104, an overlap display of two images is performed and the display contents of the PC picture plane 104 cannot be distinguished. In the invention, therefore, processes such that the display position of the PC picture plane 104 to the printer image picture plane 102 is detected and all of the pixel data of the display area of the PC picture plane is converted into black data from the image data of the printer image picture plane in the frame memory are executed. The conversion to the black data in the display area of the PC picture plane in the printer image picture plane is executed by using the picture plane of the liquid crystal display 10-1 of the personal computer 10 as shown in, for example, FIG. 22. Namely, a printer image picture plane 182 to be displayed on the liquid crystal display 10-1 of the personal computer 10 by the projector apparatus 100 is displayed. The operator sets a cursor 186 to the origin P of a PC picture plane setting area 184 on the printer image picture plane 182 by a mouse operation. In this instance, since a size (Lx, Ly) of PC picture plane has been predetermined, the image data in the area 184 is converted into black data as shown by a hatched region by a converting operation by setting the point P by the cursor 186. As a process for converting the area corresponding to the PC picture plane from the image data of the printer image picture plane to the black data, there are two kinds of processes such as manual process based on an instruction by the operator using the liquid crystal display of the personal computer in FIG. 22 and an automatic process based on control parameters derived from adjusting states of the first and second optical units on the projector apparatus 100 side.

Figure 22:
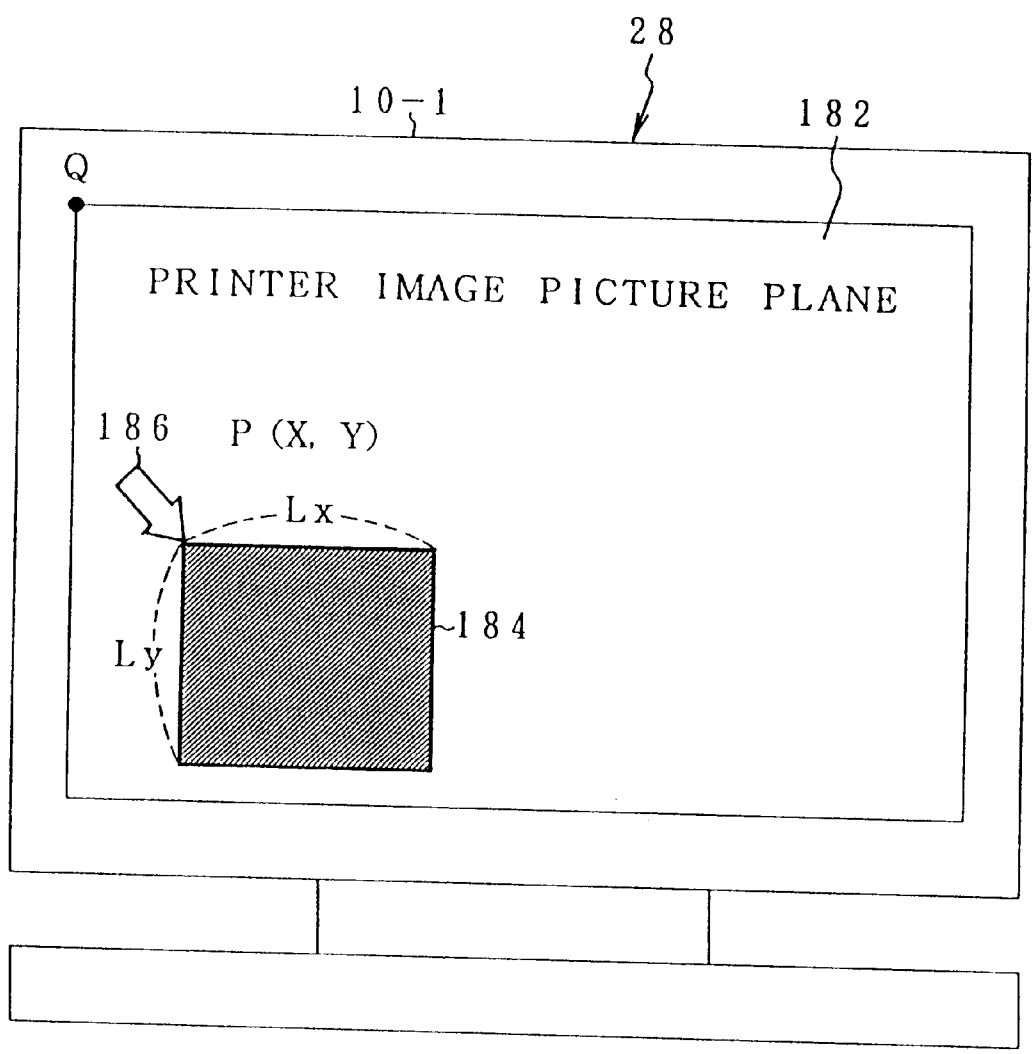
FIG. 22 is an explanatory diagram of a manual process of a black data conversion of a PC picture plane area set in the printer image picture plane.
Figure 23:
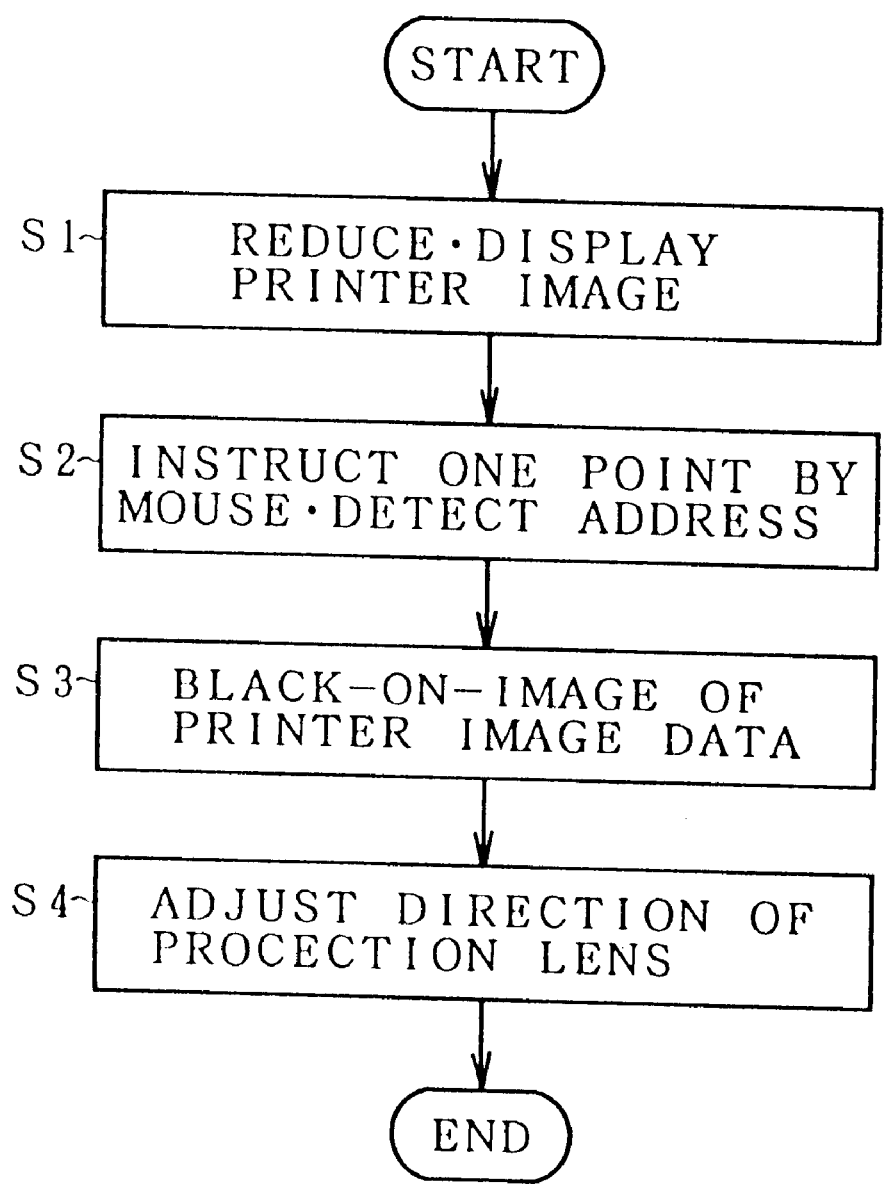
FIG. 23 is a flowchart for the manual process of the black data conversion of the PC picture plane area set in the printer image picture plane of FIG. 22.

FIG. 23 is a flowchart for the manual process based on the instruction by the operator. First in step S1, as shown in FIG. 22, the printer image picture plane to be displayed on the screen by the projector apparatus is reduced and displayed to the liquid crystal display 10-1 of the personal computer 10. In step S2, when the operator designates one arbitrary point on the displayed printer image picture plane to set the PC picture plane by a mouse, an address (x, y) of the designated point P is detected. In step S3, the range 184 of the PC picture plane size (Lx, Ly) which has been predetermined by using the designated point P(x, y) as a start point is converted into the black data. Finally, the printer image picture plane converted into the black data is projected onto the screen by the projector apparatus 100. The operator adjusts the direction of the second optical unit 110 for PC picture plane provided for the projector apparatus so that the PC picture plane is fitted into the black portion on the projection screen.

Figure 24:
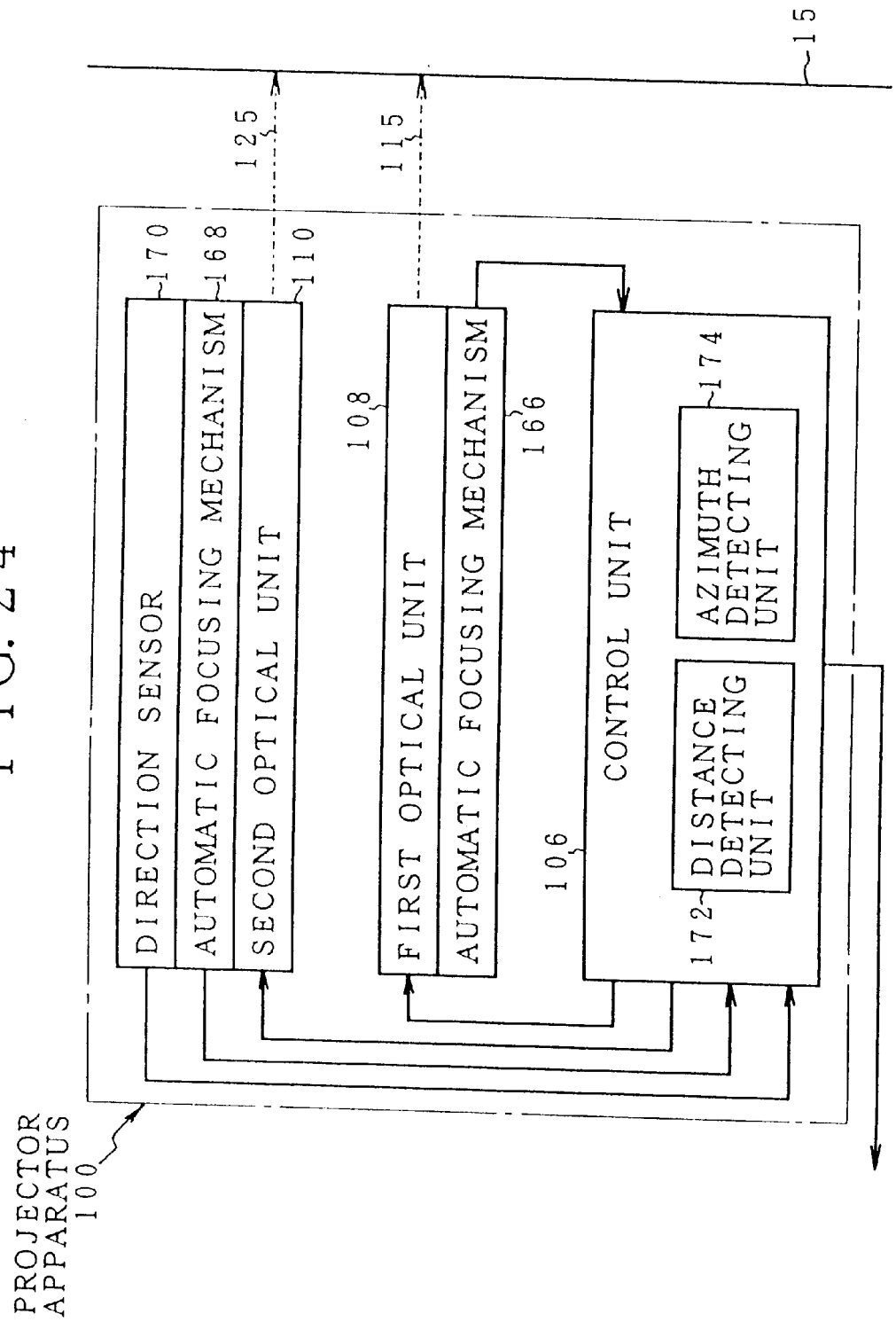
FIG. 24 is an explanatory diagram of a projector apparatus for realizing an automatic process of the black data conversion of the PC picture plane area set in the printer image picture plane.

FIG. 24 shows an embodiment of the projector apparatus 100 to enable the automatic process when the area to display the PC picture plane into the printer image picture plane is converted into the black data. To convert the display area of the PC picture plane into the black data, the first and second optical units 108 and 110 of the projector apparatus 100 have automatic focusing mechanisms 166 and 168, respectively. Further, the second optical unit 110 has an azimuth sensor 170 to detect the directions around the horizontal and vertical planes of the optical axis 125. When the image data of the printer image picture plane of the PC picture plane area is converted into the black data, the printer image picture plane is displayed on the screen 15 by the first optical unit 108. In this state, the PC picture plane is projected and displayed onto the screen 15 by the second optical unit 110. When the display operation of the second optical unit 110 is executed, the automatic focusing mechanism 168 operates and a focusing control is executed so as to form an optical image onto the screen 15. By the automatic focusing control by the automatic focusing mechanism 168, a distance detecting unit 172 of the control unit 106 can detect a distance to the screen 15. Further, the optical axis 125 of the second optical unit 110 is arbitrarily adjusted for the screen 15 and the optical axis 115 is adjusted by the first optical unit 108 so that the PC picture plane comes to an arbitrary position in the displayed printer image picture plane. The adjustment result to decide the position of the PC picture plane of the second optical unit is derived as azimuth information around the horizontal and vertical planes by the azimuth sensor 170. An azimuth detecting unit 174 provided for the control unit 106 detects the direction of the optical axis 125 of the second optical unit 110 for the screen 15. The distance to the screen 15 and the azimuth information of the optical axis 125 which were detected by the control unit 106 as mentioned above are transferred from the projector apparatus 100 in FIG. 19 to the MPU 14 side of the personal computer 10 through the bidirectional interface cable 90 for printer. The MPU 14 detects the position P(x, y) of the origin on the printer image picture plane from the direction and distance of the optical axis of the PC picture plane for the screen and converts the area of the predetermined PC picture plane size (Lx, Ly) into the black data. Further, although FIGS. 21A and 21B relate to the case where the user desires to set the magnification of the PC picture plane 104 set to 1, when the operator wants to increase the magnification of the PC picture plane 104 as shown in FIG. 21C, in the control unit 106 in FIG. 24, an enlargement magnification of the second optical unit 110 is detected and transmitted to the personal computer 10 side. On the personal computer 10 side, the set size (Lx, Ly) of PC picture plane is enlarged by the detected magnification and the enlarged area is converted into the black data.

Figure 25:
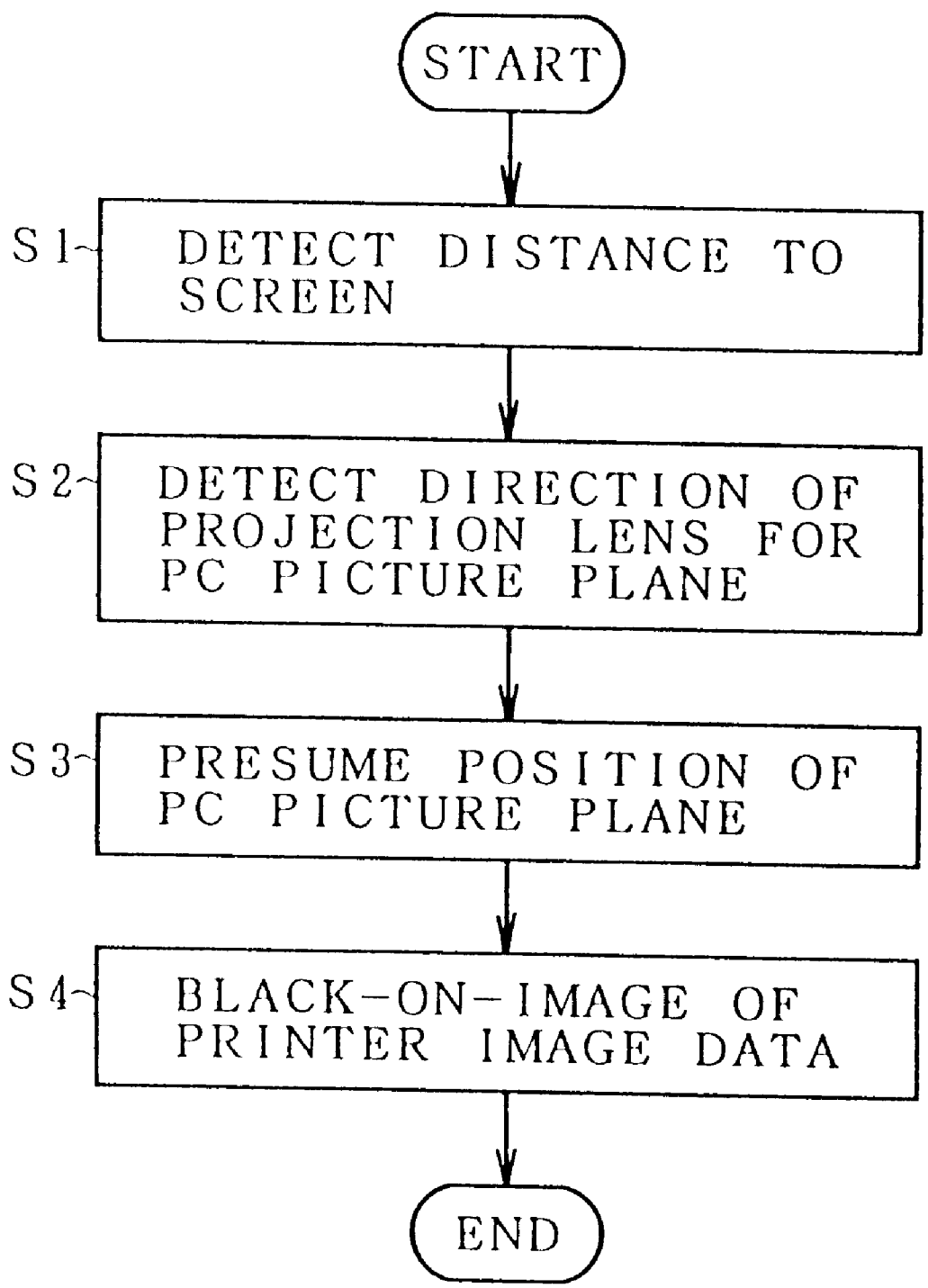
FIG. 25 is a flowchart for an automatic process of the black data conversion of the PC picture plane area set in the printer image picture plane.

FIG. 25 is a flowchart for the automatic process of the black data conversion of the area of the printer image picture plane corresponding to the PC picture plane based on the focal distance and the azimuth information of the optical axis on the projector 12 side in FIG. 24. First in step S1, since the automatic focusing control, namely, in-focusing operation of the PC picture plane to the screen by the automatic focusing mechanism is executed, a distance to the screen is detected on the basis of it. In step S2, the operator detects the direction of the optical axis by the adjustment of the projection lens, namely, the second optical unit 110 for the PC picture plane on the screen. The information of the distance to the screen detected in steps S1 and S2 and the information of the azimuth of the optical axis of the second optical unit 110 are transferred to the personal computer 10 side in step S3 and the position of the PC picture plane in the printer image picture plane is presumed. In step S4, a data black-on-image process for converting the area of the PC picture plane display area size (Lx, Ly) according to the magnification into the black data is executed. When the black-on-image process of the printer image data is finished in step S4, the black-on-image processed image data is supplied to the projector apparatus 12 and is displayed on the screen and it is sufficient for the operator to perform the final matching of the position of the PC picture plane to the black-on-image area.

The embodiment of FIG. 13 has been shown and described with respect to the case where the first and second optical units 108 and 110 for monochromatic image are provided as shown in FIG. 15 as an example. However, it is also possible to provide the same first and second color optical units as the color optical unit 264 shown in FIG. 3 and to enable a color printer image picture plane and a color PC picture plane to be displayed on the screen.

In the embodiment of FIG. 20, although the TFT type liquid crystal panel as a second liquid crystal unit 320 to display the PC picture plane onto the screen has been used as a second liquid crystal panel 152, the same phase transition type liquid crystal panel as the first liquid crystal panel 52 can be also obviously used.

Further, as a drawing controller 46 to perform the writing display of the first liquid crystal panel 52 of the phase transition type provided for the first liquid crystal unit 310 in FIG. 20, by executing the high speed write control shown in FIGS. 6 to 12 in substantially the same manner as the case of the drawing controller 46 in FIG. 4, the high speed display in which the display time per picture plane is remarkably reduced can be realized.

In the image display system using the projector 100 which can simultaneously display the printer image picture plane 102 and PC picture plane 104 in FIG. 13, for example, at the time of the presentation using the image information prepared by the personal computer 10, it is sufficient to display a main presentation image by the printer image picture plane 102 and to display auxiliary presentation information to the PC picture plane 104.

As display information of the PC picture plane 104, auxiliary information which is used for switching, explanation, or the like of the main printer image picture plane 102 is displayed and it is sufficient for an explainer to describe the contents of the printer image picture plane 102 while looking at the PC picture plane 104. As a way of using the printer image picture plane 102 and PC picture plane 104, a proper method can be used as necessary.

Further, although the above embodiments have been shown and described with respect to the projector apparatus 12 as an external apparatus which is connected to the personal computer 10, the invention is not limited to such an example. The invention can be applied as it is to an image display system to which a proper display apparatus having a display speed exceeding the data transfer speed from the personal computer 10 is externally connected.

As a projector apparatus 12 in the above embodiment, a front projector in which the screen 15 is separated and arranged in front of the projector apparatus 12 has been used as an example. However, a rear projector in which a lenticular screen is arranged in a display portion of a cabinet and the light from a built-in display unit is projected to the screen can be also obviously used.

According to the invention as described above, by directly using the existing bidirectional interface for printer which has been equipped as a standard device for the personal computer, the compressed image data is transferred to the display apparatus, for example, projector apparatus which is externally connected. Therefore, the problem such that even when the data transfer speed of the interface is slower than the display speed of the display apparatus, the display speed becomes slow due to the data transfer speed is solved. The efficient transfer display of the image data can be realized.

In the image display system of the invention, two independent picture planes are projected and displayed onto the screen by, for example, the projector apparatus connected externally to the personal computer, one of the picture planes is set to the picture plane of a number of pixels and a high quality due to the compression transmission using the bidirectional interface for printer, and the other picture plane is set to, for example, the personal computer picture plane itself of a small number of pixels transmitted by the unidirectional interface for display of the personal computer. With this construction, upon presentation, the PC picture plane is displayed as an auxiliary picture plane for the main printer image picture plane and auxiliary information such as guidance, picture plane information, or the like necessary to explain the presentation can be clearly displayed on the screen. The presentation can be more efficiently performed.

Further, with respect to the writing display of the phase transition type liquid crystal panel of a number of pixels and a high resolution for displaying a printer image picture plane, by simultaneously executing the writing display of a plurality of lines by the writing of one time, the writing display of all pixels can be completed without needing the writing time of all lines. A delay of the display speed which is a drawback of the phase transition type liquid crystal panel is solved. Both of the high resolution due to a number of pixels and the improvement of the display speed can be realized.

What is claimed is:

1. An image display system for transferring image data from an upper apparatus to a display apparatus and displaying, wherein:

said upper apparatus has an image data storing unit in which image data developed to bit map data has been stored, a compressing unit reading out the image data from said image data storing unit and compressing, and an upper side bidirectional interface transferring the image data compressed by said compressing unit to said display apparatus, said display apparatus has a display side bidirectional interface receiving said compressed image data transferred from said upper apparatus, a decoding unit reconstructing the original image data by decoding said compressed image data transferred from said upper apparatus, and a drawing controller displaying the image data decoded by said decoding unit to a display unit, wherein said display unit is a projector unit having a first display panel projecting and displaying a first image which is drawn by said drawing controller to a screen, a second display panel projecting and displaying a second image which is drawn by said display controller to said screen, and an adjusting unit adjusting display positions and display sizes of said first and second images on said screen, wherein said drawing controller converts an image portion corresponding to a display area of said second image which is overlappingly displayed to said first image projected and displayed on the screen into black data and draws said first image to said first display panel, and said drawing controller projects and displays said second image into an image blank portion on the screen by the drawing of the black data of said first image.

2. A system according to claim 1, wherein:

said upper side and display side bidirectional interfaces are parallel interfaces each having a bidirectional transmitting function for printer; and said transmission interface and said reception interface are interfaces for display each having a unidirectional transmitting function.

3. A system according to claim 1, wherein said adjusting unit is a projection optical unit in which projecting positions and magnifications of said first and second display panels can independently be adjusted.

4. A system according to claim 1, wherein said drawing controller converts the area of the image data corresponding to the display size of the predetermined second image into the black data on the basis of a distance from said projector unit to the screen, a direction, and a magnification.

5. A system according to claim 1, wherein said drawing controller has:

a display line setting unit for setting an order of display lines to be written and displayed to said liquid crystal display panel;

a reading unit for reading out line data from said image data storing unit in accordance with the order set by said display line setting unit;

a write line detecting unit for comparing said line data with each line data in said image data storing unit and detecting display lines for writing to said liquid crystal display panel each time the line data is read out by said reading unit; and a display driving unit for writing and displaying the line data read out by said reading unit to one or a plurality of said display lines for writing of said liquid crystal display panel detected by said write line detecting unit.

6. A system according to claim 5, wherein said reading unit has a display pixel detecting unit for detecting whether the read-out line data includes display pixels which need to be written to said liquid crystal display panel or not, and when said line data doesn't include the display pixels, said write line detecting unit and said display unit are skipped and a next display line is read out.

7. A system according to claim 5, wherein said write line detecting unit detects the display line of the same display pixels as those of the line data read out by said reading unit from said image data storing unit.

8. A system according to claim 5, wherein said write line detecting unit detects the display lines partially including display pixels of the line data read out by said reading unit from said image data storing unit.

9. A system according to claim 5, wherein said display driving unit writes the line data to only the display pixels which are not written to said liquid crystal display panel.

10. A system according to claim 5, wherein said display unit also overwrites the line data to display pixels which have already been written.

11. A system according to claim 5, wherein when all of the display pixels of the detected display lines have already been written, said write line detecting unit excludes said detected lines from write lines.

12. A system according to claim 5, wherein said display line setting unit sequentially designates the display lines of said liquid crystal display panel from the head and allows said reading unit to read out the line data.

13. A system according to claim 5, wherein said display line setting unit sequentially designates the display lines in accordance with the order from the display line of the small number of display pixels included in the line data and allows said reading unit to read out the line data.

14. A projector for optically projecting a display image of a display panel onto a screen and displaying, comprising:

a first display panel projecting and displaying a first image which is drawn by a drawing controller onto the screen;

a second display panel projecting and displaying a second image which is drawn by a display controller onto the screen; and an adjusting unit adjusting display positions and display sizes of said first and second images on the screen, wherein said drawing controller converts and image portion corresponding to a display area of said second image which is overlappingly displayed to said first image which was projected and displayed onto the screen into black data and draws said first image to said first display panel, and said drawing controller projects and displays said second image into an image blank portion on the screen by the drawing of the black data of said first image.

15. A projector according to claim 14, wherein said adjusting unit is a projection optical unit in which projecting positions and magnifications of said first and second display panels can independently be adjusted.

16. A system according to claim 14, wherein said drawing controller converts the area of the image data corresponding to the display size of the predetermined second image into the black data on the basis of a distance from said projector unit to the screen, a direction, and a magnification.

17. An image display system for transferring image data from an upper apparatus to a display apparatus and displaying, wherein:

said upper apparatus has an image data storing unit in which image data developed to bit map data has been stored, and an upper side bidirectional interface transferring said image data to said display apparatus, said display apparatus has a display side bidirectional interface receiving said image data transferred from said upper apparatus, and a drawing controller displaying said image data to a display unit, wherein said display unit is a projector unit having a first display panel projecting and displaying a first image which is drawn by said drawing controller to a screen, a second display panel projecting and displaying a second image which is drawn by said display controller to said screen, and an adjusting unit adjusting display positions and display sizes of said first and second images on said screen, wherein said drawing controller converts an image portion corresponding to a display area of said second image which is overlappingly displayed to said first image projected and displayed on the screen into black data and draws said first image to said first display panel, and said drawing controller projects and displays said second image into an image blank portion on the screen by the drawing of the black data of said first image.

\* \* \* \* \*